US011157109B1

United States Patent
Shorten et al.

(10) Patent No.: US 11,157,109 B1
(45) Date of Patent: Oct. 26, 2021

(54) TOUCH SENSING WITH WATER REJECTION

(71) Applicant: Apple Inc., Cupertino, CA (US)

(72) Inventors: Andrew William Shorten, San Jose, CA (US); Sai Zhang, Santa Clara, CA (US); Andreas Johannes Koeberl, San Francisco, CA (US); Eric S. Winokur, San Francisco, CA (US); Liqun Yang, Shanghai (CN); Sabino Joseph Pietrangelo, II, Mountain View, CA (US); Branislav Jovanovic, San Francisco, CA (US); Ari Y. Benbasat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/786,921

(22) Filed: Feb. 10, 2020

Related U.S. Application Data

(60) Provisional application No. 62/897,118, filed on Sep. 6, 2019.

(51) Int. Cl.
  *G06F 3/041*   (2006.01)
  *G06F 3/01*    (2006.01)
  *G06F 3/044*   (2006.01)

(52) U.S. Cl.
  CPC .......... *G06F 3/04186* (2019.05); *G06F 3/017* (2013.01); *G06F 3/044* (2013.01); *G06F 2203/04104* (2013.01)

(58) Field of Classification Search
  CPC ...... G06F 3/04186; G06F 3/017; G06F 3/044; G06F 2203/04104
  See application file for complete search history.

(56) References Cited

U.S. PATENT DOCUMENTS

| 4,087,625 A | 5/1978 | Dym et al. |
| 4,090,092 A | 5/1978 | Serrano |

(Continued)

FOREIGN PATENT DOCUMENTS

| CN | 101122838 A | 2/2008 |
| CN | 101349957 A | 1/2009 |

(Continued)

OTHER PUBLICATIONS

Advisory Action received for U.S. Appl. No. 11/818,498, dated May 17, 2013, 5 pages.

(Continued)

*Primary Examiner* — Sahlu Okebato
(74) *Attorney, Agent, or Firm* — Kubota & Basol LLP

(57) ABSTRACT

Techniques for rejecting apparent (but false) touches caused by objects such as water droplets located in areas with parasitic capacitive paths to ground are disclosed. To minimize these false touches, one or more guard conductors can be located in proximity to the housing and driven with a stimulation signal to shield objects from being capacitively coupled to ground through the housing. In some examples images of touch can be obtained from a non-bootstrapped or bootstrapped scan and also an extended bootstrapped scan wherein the guard conductor is driven with a stimulation signal that has the same characteristics as the stimulation signal being applied to the sensed touch nodes. In some examples, the results of the extended bootstrapped scan can be subtracted from the non-bootstrapped or bootstrapped scan to identify and reject apparent touches resulting from capacitive coupling to ground.

28 Claims, 10 Drawing Sheets

(56) References Cited

U.S. PATENT DOCUMENTS

| | | |
|---|---|---|
| 4,475,235 A | 10/1984 | Graham |
| 4,550,221 A | 10/1985 | Mabusth |
| 5,459,463 A | 10/1995 | Gruaz et al. |
| 5,631,670 A | 5/1997 | Tomiyoshi et al. |
| 5,844,506 A | 12/1998 | Binstead |
| 5,914,465 A | 6/1999 | Allen et al. |
| 5,923,997 A | 7/1999 | Miyanaga et al. |
| 6,137,427 A | 10/2000 | Binstead |
| 6,188,391 B1 | 2/2001 | Seely et al. |
| 6,239,788 B1 | 5/2001 | Nohno et al. |
| 6,252,825 B1 | 6/2001 | Perotto |
| 6,323,846 B1 | 11/2001 | Westerman et al. |
| 6,329,044 B1 | 12/2001 | Inoue et al. |
| 6,452,514 B1 | 9/2002 | Philipp |
| 6,456,952 B1 | 9/2002 | Nathan |
| 6,730,863 B1 | 5/2004 | Gerpheide et al. |
| 6,970,160 B2 | 11/2005 | Mulligan et al. |
| 7,129,935 B2 | 10/2006 | Mackey |
| 7,180,508 B2 | 2/2007 | Kent et al. |
| 7,395,717 B2 | 7/2008 | Deangelis et al. |
| 7,412,586 B1 | 8/2008 | Rajopadhye et al. |
| 7,504,833 B1 | 3/2009 | Seguine |
| 7,548,073 B2 | 6/2009 | Mackey et al. |
| 7,639,234 B2 | 12/2009 | Orsley |
| 7,719,523 B2 | 5/2010 | Hillis |
| 7,932,898 B2 | 4/2011 | Philipp et al. |
| 8,026,904 B2 | 9/2011 | Westerman |
| 8,040,321 B2 | 10/2011 | Peng et al. |
| 8,058,884 B2 | 11/2011 | Betancourt |
| 8,068,097 B2 | 11/2011 | Guanghai |
| 8,120,371 B2 | 2/2012 | Day et al. |
| 8,125,312 B2 | 2/2012 | Orr |
| 8,169,421 B2 | 5/2012 | Wright et al. |
| 8,258,986 B2 | 9/2012 | Makovetskyy |
| 8,390,573 B2 | 3/2013 | Trout |
| 8,441,464 B1 | 5/2013 | Lin et al. |
| 8,507,811 B2 | 8/2013 | Hotelling et al. |
| 8,508,495 B2 | 8/2013 | Hotelling et al. |
| 8,525,756 B2 | 9/2013 | Kwon |
| 8,537,126 B2 | 9/2013 | Yousefpor et al. |
| 8,593,410 B2 | 11/2013 | Hong et al. |
| 8,614,688 B2 | 12/2013 | Chang |
| 8,760,412 B2 | 6/2014 | Hotelling et al. |
| 8,773,146 B1 | 7/2014 | Hills et al. |
| 8,810,524 B1 | 8/2014 | Rosenberg et al. |
| 8,884,917 B2 | 11/2014 | Seo |
| 8,902,172 B2 | 12/2014 | Peng et al. |
| 8,922,521 B2 | 12/2014 | Hotelling et al. |
| 8,976,133 B2 | 3/2015 | Yao et al. |
| 8,982,097 B1 | 3/2015 | Kuzo et al. |
| 9,024,913 B1 | 5/2015 | Jung et al. |
| 9,035,895 B2 | 5/2015 | Bussat et al. |
| 9,189,119 B2 | 11/2015 | Liao et al. |
| 9,292,137 B2 | 3/2016 | Kogo |
| 9,329,674 B2 | 5/2016 | Lee et al. |
| 9,329,723 B2 | 5/2016 | Benbasat et al. |
| 9,690,397 B2 | 6/2017 | Shepelev et al. |
| 9,785,295 B2 | 10/2017 | Yang et al. |
| 9,804,717 B2 | 10/2017 | Schropp, Jr. |
| 9,886,141 B2 | 2/2018 | Yousefpor |
| 9,904,427 B1 | 2/2018 | Co et al. |
| 9,996,175 B2 | 6/2018 | Hotelling et al. |
| 10,061,433 B2 | 8/2018 | Imai et al. |
| 10,254,896 B2 | 4/2019 | Mori et al. |
| 10,365,764 B2 | 7/2019 | Korapati et al. |
| 10,725,591 B1 * | 7/2020 | Maharyta ............ G06F 3/0446 |
| 2002/0152048 A1 | 10/2002 | Hayes |
| 2003/0076325 A1 | 4/2003 | Thrasher |
| 2003/0164820 A1 | 9/2003 | Kent |
| 2003/0210235 A1 | 11/2003 | Roberts |
| 2003/0234768 A1 | 12/2003 | Rekimoto et al. |
| 2004/0061687 A1 | 4/2004 | Kent et al. |
| 2004/0113819 A1 | 6/2004 | Gauthey et al. |
| 2004/0188151 A1 | 9/2004 | Gerpheide et al. |
| 2004/0189617 A1 * | 9/2004 | Gerpheide ............ G06F 3/0445 345/174 |
| 2004/0212586 A1 | 10/2004 | Denny |
| 2004/0239650 A1 | 12/2004 | Mackey |
| 2004/0241920 A1 | 12/2004 | Hsiao et al. |
| 2005/0007353 A1 | 1/2005 | Smith et al. |
| 2005/0012724 A1 | 1/2005 | Kent |
| 2005/0104867 A1 | 5/2005 | Westerman et al. |
| 2005/0126831 A1 | 6/2005 | Richter et al. |
| 2006/0017710 A1 | 1/2006 | Lee et al. |
| 2006/0097991 A1 | 5/2006 | Hotelling et al. |
| 2006/0202969 A1 | 9/2006 | Hauck |
| 2006/0227115 A1 | 10/2006 | Fry |
| 2006/0256090 A1 | 11/2006 | Huppi |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0075982 A1 | 4/2007 | Morrison et al. |
| 2007/0191070 A1 | 8/2007 | Rao |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0262963 A1 | 11/2007 | Xiao-ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279619 A1 | 12/2007 | Chang |
| 2007/0285365 A1 | 12/2007 | Lee |
| 2007/0296709 A1 | 12/2007 | Guanghai |
| 2008/0007533 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0062151 A1 | 3/2008 | Kent |
| 2008/0136792 A1 | 6/2008 | Peng et al. |
| 2008/0158145 A1 | 7/2008 | Westerman |
| 2008/0158174 A1 | 7/2008 | Land et al. |
| 2008/0158185 A1 | 7/2008 | Westerman |
| 2008/0162996 A1 | 7/2008 | Krah et al. |
| 2008/0224962 A1 | 9/2008 | Kasai et al. |
| 2008/0238871 A1 | 10/2008 | Tam |
| 2008/0238879 A1 | 10/2008 | Jaeger et al. |
| 2008/0264699 A1 | 10/2008 | Chang et al. |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309632 A1 | 12/2008 | Westerman et al. |
| 2008/0309633 A1 | 12/2008 | Hotelling et al. |
| 2009/0002337 A1 | 1/2009 | Chang |
| 2009/0020343 A1 | 1/2009 | Rothkopf et al. |
| 2009/0059730 A1 | 3/2009 | Lyons et al. |
| 2009/0070681 A1 | 3/2009 | Dawes et al. |
| 2009/0073138 A1 | 3/2009 | Lee et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0174676 A1 | 7/2009 | Westerman |
| 2009/0174744 A1 | 7/2009 | Westerman |
| 2009/0182189 A1 | 7/2009 | Lira |
| 2009/0184937 A1 | 7/2009 | Grivna |
| 2009/0213090 A1 | 8/2009 | Mamba et al. |
| 2009/0236151 A1 | 9/2009 | Yeh et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |

(56) References Cited

U.S. PATENT DOCUMENTS

| | | |
|---|---|---|
| 2009/0315854 A1 | 12/2009 | Matsuo |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0102027 A1 | 4/2010 | Liu et al. |
| 2010/0110035 A1 | 5/2010 | Selker |
| 2010/0117985 A1 | 5/2010 | Wadia |
| 2010/0156810 A1 | 6/2010 | Barbier et al. |
| 2010/0156846 A1 | 6/2010 | Long et al. |
| 2010/0182278 A1 | 7/2010 | Li et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0245286 A1 | 9/2010 | Parker |
| 2010/0253638 A1 | 10/2010 | Yousefpor et al. |
| 2010/0259503 A1 | 10/2010 | Yanase et al. |
| 2010/0328228 A1 | 12/2010 | Elias |
| 2010/0328263 A1 | 12/2010 | Lin |
| 2011/0006832 A1 | 1/2011 | Land et al. |
| 2011/0007020 A1 | 1/2011 | Hong et al. |
| 2011/0025623 A1 | 2/2011 | Lin |
| 2011/0025629 A1 | 2/2011 | Grivna et al. |
| 2011/0025635 A1 | 2/2011 | Lee |
| 2011/0057899 A1 | 3/2011 | Sleeman et al. |
| 2011/0061949 A1 | 3/2011 | Krah et al. |
| 2011/0074705 A1 | 3/2011 | Yousefpor et al. |
| 2011/0134050 A1 | 6/2011 | Harley |
| 2011/0157068 A1 | 6/2011 | Parker et al. |
| 2011/0231139 A1 | 9/2011 | Yokota et al. |
| 2011/0234523 A1 | 9/2011 | Chang et al. |
| 2011/0241907 A1 | 10/2011 | Cordeiro |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |
| 2011/0298727 A1 | 12/2011 | Yousefpor et al. |
| 2011/0310033 A1 | 12/2011 | Liu et al. |
| 2011/0310064 A1 | 12/2011 | Keski-jaskari et al. |
| 2012/0026099 A1 | 2/2012 | Harley |
| 2012/0050206 A1 | 3/2012 | Welland |
| 2012/0050214 A1 | 3/2012 | Kremin et al. |
| 2012/0050216 A1 | 3/2012 | Kremin et al. |
| 2012/0050217 A1 | 3/2012 | Noguchi et al. |
| 2012/0054379 A1 | 3/2012 | Leung et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0146726 A1 | 6/2012 | Huang et al. |
| 2012/0146920 A1 | 6/2012 | Lin et al. |
| 2012/0146942 A1 | 6/2012 | Kamoshida et al. |
| 2012/0154324 A1 | 6/2012 | Wright et al. |
| 2012/0162121 A1 | 6/2012 | Chang et al. |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2012/0313881 A1 | 12/2012 | Ge et al. |
| 2012/0320385 A1 | 12/2012 | Mu et al. |
| 2013/0015868 A1 | 1/2013 | Peng |
| 2013/0038573 A1 | 2/2013 | Chang et al. |
| 2013/0069911 A1 | 3/2013 | You |
| 2013/0076648 A1 | 3/2013 | Krah et al. |
| 2013/0093712 A1 | 4/2013 | Liu et al. |
| 2013/0100071 A1 | 4/2013 | Wright et al. |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0176271 A1 | 7/2013 | Sobel et al. |
| 2013/0176273 A1 | 7/2013 | Li et al. |
| 2013/0215075 A1 | 8/2013 | Lee et al. |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0265276 A1 | 10/2013 | Obeidat et al. |
| 2013/0271427 A1 | 10/2013 | Benbasat et al. |
| 2013/0278447 A1 | 10/2013 | Kremin |
| 2013/0278543 A1 | 10/2013 | Hsu et al. |
| 2013/0307821 A1 | 11/2013 | Kogo |
| 2013/0308031 A1 | 11/2013 | Theuwissen |
| 2013/0314342 A1 | 11/2013 | Kim et al. |
| 2013/0320994 A1 | 12/2013 | Brittain et al. |
| 2013/0328759 A1 | 12/2013 | Al-dahle et al. |
| 2014/0002406 A1 | 1/2014 | Cormier, Jr. et al. |
| 2014/0022201 A1 | 1/2014 | Boychuk et al. |
| 2014/0071084 A1 | 3/2014 | Sugiura |
| 2014/0078096 A1 | 3/2014 | Tan et al. |
| 2014/0098051 A1 | 4/2014 | Hong et al. |
| 2014/0104194 A1 | 4/2014 | Davidson et al. |
| 2014/0104225 A1 | 4/2014 | Davidson et al. |
| 2014/0104228 A1 | 4/2014 | Chen et al. |
| 2014/0118270 A1 | 5/2014 | Moses et al. |
| 2014/0125628 A1 | 5/2014 | Yoshida et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0168540 A1 | 6/2014 | Wang et al. |
| 2014/0180481 A1 | 6/2014 | Park et al. |
| 2014/0204058 A1 | 7/2014 | Huang et al. |
| 2014/0210779 A1 | 7/2014 | Katsuta et al. |
| 2014/0232955 A1 | 8/2014 | Roudbari et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0285469 A1 | 9/2014 | Wright et al. |
| 2014/0306924 A1 | 10/2014 | Lin et al. |
| 2014/0347574 A1 | 11/2014 | Tung et al. |
| 2014/0362030 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1* | 1/2015 | Brunet .................. G06F 3/0446 345/174 |
| 2015/0002464 A1 | 1/2015 | Nishioka et al. |
| 2015/0009421 A1 | 1/2015 | Choi et al. |
| 2015/0015528 A1 | 1/2015 | Vandermeijden |
| 2015/0026398 A1 | 1/2015 | Kim |
| 2015/0042600 A1 | 2/2015 | Lukanc et al. |
| 2015/0049043 A1* | 2/2015 | Yousefpor ............. G06F 3/0448 345/174 |
| 2015/0049044 A1 | 2/2015 | Yousefpor et al. |
| 2015/0077375 A1 | 3/2015 | Hotelling et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1 | 9/2015 | Liao et al. |
| 2015/0324035 A1 | 11/2015 | Yuan et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0041629 A1 | 2/2016 | Rao et al. |
| 2016/0048234 A1 | 2/2016 | Chandran et al. |
| 2016/0062533 A1 | 3/2016 | O'connor |
| 2016/0077667 A1 | 3/2016 | Chiang et al. |
| 2016/0117032 A1 | 4/2016 | Lin et al. |
| 2016/0139728 A1 | 5/2016 | Jeon et al. |

(56) References Cited

U.S. PATENT DOCUMENTS

| | | | |
|---|---|---|---|
| 2016/0154505 A1 | 6/2016 | Chang et al. |
| 2016/0154529 A1 | 6/2016 | Westerman |
| 2016/0216801 A1 | 7/2016 | Shedletsky et al. |
| 2016/0224177 A1 | 8/2016 | Krah |
| 2016/0224189 A1 | 8/2016 | Yousefpor et al. |
| 2016/0253041 A1 | 9/2016 | Park et al. |
| 2016/0259448 A1 | 9/2016 | Guarneri |
| 2016/0266679 A1 | 9/2016 | Shahparnia et al. |
| 2016/0282980 A1 | 9/2016 | Chintalapoodi et al. |
| 2016/0357344 A1 | 12/2016 | Benbasat et al. |
| 2017/0090599 A1* | 3/2017 | Kuboyama | G04G 21/08 |
| 2017/0090619 A1 | 3/2017 | Yousefpor et al. |
| 2017/0139539 A1 | 5/2017 | Yao et al. |
| 2017/0168626 A1 | 6/2017 | Konicek |
| 2017/0229502 A1 | 8/2017 | Liu et al. |
| 2017/0269729 A1 | 9/2017 | Chintalapoodi |
| 2017/0357371 A1 | 12/2017 | Kim et al. |
| 2018/0067584 A1 | 3/2018 | Zhu et al. |
| 2018/0224962 A1 | 8/2018 | Mori |
| 2018/0275824 A1 | 9/2018 | Li et al. |
| 2018/0307374 A1 | 10/2018 | Shah et al. |
| 2018/0307375 A1 | 10/2018 | Shah et al. |
| 2018/0367139 A1 | 12/2018 | Pribisic et al. |
| 2019/0034032 A1 | 1/2019 | Westerman |
| 2019/0138152 A1 | 5/2019 | Yousefpor et al. |
| 2019/0220115 A1 | 7/2019 | Mori et al. |
| 2020/0333902 A1 | 10/2020 | Li et al. |
| 2020/0341585 A1 | 10/2020 | Li et al. |
| 2020/0387259 A1 | 12/2020 | Krah |

FOREIGN PATENT DOCUMENTS

| | | | |
|---|---|---|---|
| CN | 101840293 A | 9/2010 |
| CN | 102023768 A | 4/2011 |
| CN | 102411460 A | 4/2012 |
| CN | 103052930 A | 4/2013 |
| CN | 103221910 A | 7/2013 |
| CN | 103258492 A | 8/2013 |
| CN | 103365506 A | 10/2013 |
| CN | 103577008 A | 2/2014 |
| CN | 103885627 A | 6/2014 |
| CN | 104142757 A | 11/2014 |
| CN | 104252266 A | 12/2014 |
| CN | 105045446 A | 11/2015 |
| CN | 105278739 A | 1/2016 |
| CN | 105474154 A | 4/2016 |
| CN | 105824461 A | 8/2016 |
| EP | 2256606 A2 | 12/2010 |
| KR | 10-2012-0085737 A | 8/2012 |
| WO | 2011/071784 A1 | 6/2011 |

OTHER PUBLICATIONS

Advisory Action received for U.S. Appl. No. 11/818,498, dated Oct. 14, 2011, 5 pages.
Advisory Action received for U.S. Appl. No. 12/206,680, dated Apr. 16, 2012, 3 pages.
Advisory Action received for U.S. Appl. No. 12/238,333, dated Dec. 17, 2013, 3 pages.
Advisory Action received for U.S. Appl. No. 12/238,333, dated Oct. 21, 2015, 4 pages.
Advisory Action received for U.S. Appl. No. 12/500,911, dated May 17, 2013, 3 pages.
Advisory Action received for U.S. Appl. No. 12/642,466, dated May 23, 2013, 2 pages.
Advisory Action received for U.S. Appl. No. 14/082,003, dated Mar. 10, 2016, 3 pages.
Advisory Action received for U.S. Appl. No. 14/645,120, dated Nov. 25, 2016, 3 pages.
Advisory Action received for U.S. Appl. No. 15/017,463, dated Aug. 8, 2018, 3 pages.
Examiner's Answer to Appeal Brief received for U.S. Appl. No. 11/818,498, dated Dec. 20, 2013, 17 pages.
Examiner's Answer to Appeal Brief received for U.S. Appl. No. 14/915,224, dated Oct. 6, 2020, 11 pages.
Extended European Search Report received for European Patent Application No. 18197785.1, dated Apr. 5, 2019, 8 pages.
Final Office Action received for U.S. Appl. No. 11/818,498, dated Jan. 3, 2013, 17 pages.
Final Office Action received for U.S. Appl. No. 11/818,498, dated Jun. 10, 2011, 16 pages.
Final Office Action received for U.S. Appl. No. 12/206,680, dated Jan. 5, 2012, 16 pages.
Final Office Action received for U.S. Appl. No. 12/206,680, dated Jan. 27, 2014, 20 pages.
Final Office Action received for U.S. Appl. No. 12/206,680, dated May 22, 2013, 16 pages.
Final Office Action received for U.S. Appl. No. 12/238,333, dated Apr. 22, 2015, 23 pages.
Final Office Action received for U.S. Appl. No. 12/238,333, dated Aug. 12, 2013, 19 pages.
Final Office Action received for U.S. Appl. No. 12/238,342, dated Aug. 13, 2013, 14 pages.
Final Office Action received for U.S. Appl. No. 12/238,342, dated Oct. 22, 2014, 16 pages.
Final Office Action received for U.S. Appl. No. 12/494,173, dated Apr. 30, 2013, 7 pages.
Final Office Action received for U.S. Appl. No. 12/500,911, dated Feb. 5, 2013, 16 pages.
Final Office Action received for U.S. Appl. No. 12/545,604, dated Jul. 16, 2014, 18 pages.
Final Office Action received for U.S. Appl. No. 12/545,604, dated Jul. 19, 2013, 18 pages.
Final Office Action received for U.S. Appl. No. 12/545,754, dated Jun. 21, 2013, 6 pages.
Final Office Action received for U.S. Appl. No. 12/642,466, dated Feb. 1, 2013, 10 pages.
Final Office Action received for U.S. Appl. No. 12/642,466, dated Jan. 29, 2016, 10 pages.
Final Office Action received for U.S. Appl. No. 12/642,466, dated May 9, 2014, 13 pages.
Final Office Action received for U.S. Appl. No. 13/448,182, dated Jun. 11, 2015, 13 pages.
Final Office Action received for U.S. Appl. No. 13/448,182, dated Oct. 22, 2014, 12 pages.
Final Office Action received for U.S. Appl. No. 13/899,391, dated Apr. 8, 2016, 10 pages.
Final Office Action received for U.S. Appl. No. 14/082,003, dated Jan. 4, 2016, 26 pages.
Final Office Action received for U.S. Appl. No. 14/082,003, dated Nov. 4, 2016, 19 pages.
Final Office Action received for U.S. Appl. No. 14/082,074, dated Nov. 12, 2015, 23 pages.
Final Office Action received for U.S. Appl. No. 14/318,157, dated Jul. 26, 2017, 10 pages.
Final Office Action received for U.S. Appl. No. 14/318,157, dated May 9, 2016, 10 pages.
Final Office Action received for U.S. Appl. No. 14/550,686, dated Aug. 21, 2017, 12 pages.
Final Office Action received for U.S. Appl. No. 14/550,686, dated Jun. 14, 2016, 11 pages.
Final Office Action received for U.S. Appl. No. 14/558,529, dated Sep. 29, 2016, 23 pages.
Final Office Action received for U.S. Appl. No. 14/645,120, dated Aug. 10, 2017, 13 pages.
Final Office Action received for U.S. Appl. No. 14/645,120, dated May 27, 2016, 13 pages.
Final Office Action received for U.S. Appl. No. 14/915,224, dated Jan. 14, 2019, 8 pages.
Final Office Action received for U.S. Appl. No. 14/915,224, dated Nov. 18, 2019, 9 pages.
Final Office Action received for U.S. Appl. No. 14/993,017, dated Aug. 16, 2018, 35 pages.
Final Office Action received for U.S. Appl. No. 15/006,987, dated Dec. 5, 2017, 16 pages.

(56) References Cited

OTHER PUBLICATIONS

Final Office Action received for U.S. Appl. No. 15/006,987, dated May 14, 2018, 11 pages.
Final Office Action received for U.S. Appl. No. 15/009,774, dated Feb. 6, 2019, 16 pages.
Final Office Action received for U.S. Appl. No. 15/017,463, dated Feb. 13, 2020, 22 pages.
Final Office Action received for U.S. Appl. No. 15/017,463, dated May 17, 2018, 23 pages.
Final Office Action received for U.S. Appl. No. 15/097,179, dated Jul. 27, 2018, 12 pages.
Final Office Action received for U.S. Appl. No. 15/313,549, dated Dec. 18, 2019, 24 pages.
Final Office Action received for U.S. Appl. No. 15/507,722, dated Sep. 13, 2019, 18 pages.
Final Office Action received for U.S. Appl. No. 15/522,737, dated Sep. 12, 2019, 15 pages.
Final Office Action received for U.S. Appl. No. 16/152,326, dated Jan. 27, 2020, 10 pages.
Final Office Action received for U.S. Appl. No. 16/201,730, dated Nov. 1, 2019, 11 pages.
First Action Interview Office Action received for U.S. Appl. No. 15/686,969, dated Aug. 19, 2019, 7 pages.
International Search Report received for PCT Patent Application No. PCT/US2010/022868, dated Mar. 10, 2010, 3 pages.
Non-Final Office Action received for U.S. Appl. No. 11/818,498, dated Dec. 13, 2010, 16 pages.
Non-Final Office Action received for U.S. Appl. No. 11/818,498, dated May 25, 2012, 17 pages.
Non-Final Office Action received for U.S. Appl. No. 12/206,680, dated Jun. 9, 2011, 14 pages.
Non-Final Office Action received for U.S. Appl. No. 12/206,680, dated Sep. 26, 2012, 14 pages.
Non-Final Office Action received for U.S. Appl. No. 12/206,680, dated Sep. 30, 2013, 19 pages.
Non-Final Office Action received for U.S. Appl. No. 12/238,333, dated Jan. 7, 2013, 21 pages.
Non-Final Office Action received for U.S. Appl. No. 12/238,333, dated May 3, 2012, 24 pages.
Non-Final Office Action received for U.S. Appl. No. 12/238,333, dated Sep. 18, 2014, 22 pages.
Non-Final Office Action received for U.S. Appl. No. 12/238,342, dated Feb. 15, 2013, 18 pages.
Non-Final Office Action received for U.S. Appl. No. 12/238,342, dated Mar. 9, 2012, 27 pages.
Non-Final Office Action received for U.S. Appl. No. 12/238,342, dated Mar. 12, 2014, 17 pages.
Non-Final Office Action received for U.S. Appl. No. 12/494,173, dated Nov. 28, 2012, 7 pages.
Non-Final Office Action received for U.S. Appl. No. 12/500,911, dated Jun. 7, 2012, 17 pages.
Non-Final Office Action received for U.S. Appl. No. 12/545,557, dated Jan. 3, 2014, 10 pages.
Non-Final Office Action received for U.S. Appl. No. 12/545,557, dated Nov. 23, 2012, 11 pages.
Non-Final Office Action received for U.S. Appl. No. 12/545,604, dated Dec. 19, 2013, 17 pages.
Non-Final Office Action received for U.S. Appl. No. 12/545,604, dated Jan. 7, 2013, 13 pages.
Non-Final Office Action received for U.S. Appl. No. 12/545,754, dated Jan. 2, 2014, 12 pages.
Non-Final Office Action received for U.S. Appl. No. 12/545,754, dated Oct. 5, 2012, 10 pages.
Non-Final Office Action received for U.S. Appl. No. 12/545,754, dated Sep. 10, 2013, 6 pages.
Non-Final Office Action received for U.S. Appl. No. 12/642,466, dated Aug. 28, 2012, 10 pages.
Non-Final Office Action received for U.S. Appl. No. 12/642,466, dated May 4, 2015, 10 pages.
Non-Final Office Action received for U.S. Appl. No. 12/642,466, dated Nov. 8, 2013, 13 pages.
Non-Final Office Action received for U.S. Appl. No. 13/448,182, dated Jan. 31, 2014, 18 pages.
Non-Final Office Action received for U.S. Appl. No. 13/737,779, dated Mar. 29, 2013, 10 pages.
Non-Final Office Action received for U.S. Appl. No. 13/899,391, dated Oct. 5, 2015, 11 pages.
Non-Final Office Action received for U.S. Appl. No. 14/055,717, dated Apr. 10, 2014, 11 pages.
Non-Final Office Action received for U.S. Appl. No. 14/082,003, dated Mar. 13, 2017, 21 pages.
Non-Final Office Action received for U.S. Appl. No. 14/082,003, dated May 8, 2015, 26 pages.
Non-Final Office Action received for U.S. Appl. No. 14/082,003, dated May 25, 2016, 23 pages.
Non-Final Office Action received for U.S. Appl. No. 14/082,074, dated Apr. 10, 2015, 24 pages.
Non-Final Office Action received for U.S. Appl. No. 14/318,157, dated Apr. 3, 2018, 12 pages.
Non-Final Office Action received for U.S. Appl. No. 14/318,157, dated Dec. 19, 2016, 11 pages.
Non-Final Office Action received for U.S. Appl. No. 14/318,157, dated Oct. 6, 2015, 8 pages.
Non-Final Office Action received for U.S. Appl. No. 14/550,686, dated Aug. 20, 2015, 11 pages.
Non-Final Office Action received for U.S. Appl. No. 14/550,686, dated Dec. 14, 2016, 9 pages.
Non-Final Office Action received for U.S. Appl. No. 14/558,529, dated Apr. 14, 2016, 21 pages.
Non-Final Office Action received for U.S. Appl. No. 14/558,529, dated Jun. 26, 2017, 6 pages.
Non-Final Office Action received for U.S. Appl. No. 14/615,186, dated Jun. 1, 2016, 9 pages.
Non-Final Office Action received for U.S. Appl. No. 14/645,120, dated Dec. 16, 2016, 11 pages.
Non-Final Office Action received for U.S. Appl. No. 14/645,120, dated Oct. 27, 2015, 9 pages.
Non-Final Office Action received for U.S. Appl. No. 14/915,224, dated Aug. 9, 2018, 7 pages.
Non-Final Office Action received for U.S. Appl. No. 14/915,224, dated Jul. 22, 2019, 6 pages.
Non-Final Office Action received for U.S. Appl. No. 14/993,017, dated Dec. 22, 2017, 24 pages.
Non-Final Office Action received for U.S. Appl. No. 14/993,017, dated Jan. 18, 2019, 35 pages.
Non-Final Office Action received for U.S. Appl. No. 15/006,987, dated Jun. 14, 2017, 15 pages.
Non-Final Office Action received for U.S. Appl. No. 15/009,774, dated Jun. 20, 2018, 19 pages.
Non-Final Office Action received for U.S. Appl. No. 15/009,774, dated Sep. 4, 2019, 18 pages.
Non-Final Office Action received for U.S. Appl. No. 15/017,463, dated May 15, 2019, 20 pages.
Non-Final Office Action received for U.S. Appl. No. 15/017,463, dated Sep. 14, 2017, 23 pages.
Non-Final Office Action received for U.S. Appl. No. 15/087,956, dated Jan. 18, 2019, 13 pages.
Non-Final Office Action received for U.S. Appl. No. 15/097,179, dated Jan. 22, 2018, 12 pages.
Non-Final Office Action received for U.S. Appl. No. 15/144,706, dated Apr. 7, 2017, 9 pages.
Non-Final Office Action received for U.S. Appl. No. 15/313,549, dated Apr. 23, 2020, 33 pages.
Non-Final Office Action received for U.S. Appl. No. 15/313,549, dated Dec. 21, 2018, 14 pages.
Non-Final Office Action received for U.S. Appl. No. 15/313,549, dated Jul. 10, 2019, 25 pages.
Non-Final Office Action received for U.S. Appl. No. 15/507,722, dated Feb. 11, 2019, 16 pages.
Non-Final Office Action received for U.S. Appl. No. 15/522,737, dated Jan. 2, 2019, 14 pages.

(56) References Cited

OTHER PUBLICATIONS

Non-Final Office Action received for U.S. Appl. No. 16/152,326, dated Aug. 14, 2019, 12 pages.
Non-Final Office Action received for U.S. Appl. No. 16/152,326, dated Jun. 29, 2020, 10 pages.
Non-Final Office Action received for U.S. Appl. No. 16/201,730, dated May 10, 2019, 9 pages.
Notice of Allowance received for U.S. Appl. No. 12/238,333, dated Dec. 1, 2015, 10 pages.
Notice of Allowance received for U.S. Appl. No. 12/494,173, dated Oct. 15, 2014, 8 pages.
Notice of Allowance received for U.S. Appl. No. 12/500,911, dated Aug. 19, 2013, 7 pages.
Notice of Allowance received for U.S. Appl. No. 12/545,557, dated Apr. 11, 2014, 9 pages.
Notice of Allowance received for U.S. Appl. No. 12/545,557, dated Jun. 10, 2013, 9 pages.
Notice of Allowance received for U.S. Appl. No. 12/545,604, dated Oct. 5, 2015, 9 pages.
Notice of Allowance received for U.S. Appl. No. 12/545,754, dated Aug. 21, 2014, 10 pages.
Notice of Allowance received for U.S. Appl. No. 13/448,182, dated Jan. 8, 2016, 9 pages.
Notice of Allowance received for U.S. Appl. No. 13/737,779, dated Sep. 3, 2013, 11 pages.
Notice of Allowance received for U.S. Appl. No. 14/055,717, dated Nov. 7, 2014, 7 pages.
Notice of Allowance received for U.S. Appl. No. 14/082,003, dated Oct. 3, 2017, 10 pages.
Notice of Allowance received for U.S. Appl. No. 14/082,003, dated Sep. 20, 2017, 9 pages.
Notice of Allowance received for U.S. Appl. No. 14/312,489, dated Mar. 16, 2015, 8 pages.
Notice of Allowance received for U.S. Appl. No. 14/318,157, dated Dec. 31, 2018, 8 pages.
Notice of Allowance received for U.S. Appl. No. 14/550,686, dated Feb. 9, 2018, 12 pages.
Notice of Allowance received for U.S. Appl. No. 14/558,529, dated Oct. 13, 2017, 8 pages.
Notice of Allowance received for U.S. Appl. No. 14/615,186, dated Dec. 2, 2016, 7 pages.
Notice of Allowance received for U.S. Appl. No. 14/645,120, dated Mar. 1, 2018, 6 pages.
Notice of Allowance received for U.S. Appl. No. 14/993,017, dated Jul. 12, 2019, 10 pages.
Notice of Allowance received for U.S. Appl. No. 15/009,774, dated Jul. 1, 2020, 6 pages.
Notice of Allowance received for U.S. Appl. No. 15/009,774, dated Mar. 20, 2020, 16 pages.
Notice of Allowance received for U.S. Appl. No. 15/087,956, dated Mar. 11, 2019, 11 pages.
Notice of Allowance received for U.S. Appl. No. 15/144,706, dated Sep. 20, 2017, 9 pages.
Notice of Allowance received for U.S. Appl. No. 15/313,549, dated Oct. 21, 2020, 10 pages.
Notice of Allowance received for U.S. Appl. No. 15/507,722, dated Feb. 27, 2020, 9 pages.
Notice of Allowance received for U.S. Appl. No. 15/522,737, dated Mar. 6, 2020, 8 pages.
Notice of Allowance received for U.S. Appl. No. 15/686,969, dated Jan. 2, 2020, 8 pages.
Notice of Allowance received for U.S. Appl. No. 15/687,078, dated Apr. 3, 2019, 9 pages.
Notice of Allowance received for U.S. Appl. No. 15/691,283, dated Jun. 5, 2019, 10 pages.
Patent Board Decision received for U.S. Appl. No. 11/818,498, dated Nov. 2, 2016, 8 pages.
Pre-Interview First Office Action received for U.S. Appl. No. 15/686,969, dated Apr. 4, 2019, 4 pages.
Restriction Requirement received for U.S. Appl. No. 12/238,333, dated Mar. 8, 2012, 6 pages.
Restriction Requirement received for U.S. Appl. No. 12/494,173, dated Aug. 8, 2012, 5 pages.
Restriction Requirement received for U.S. Appl. No. 13/899,391, dated Apr. 8, 2015, 6 pages.
Restriction Requirement received for U.S. Appl. No. 14/915,224, dated Apr. 4, 2018, 10 pages.
Restriction Requirement received for U.S. Appl. No. 15/087,956, dated Feb. 13, 2018, 8 pages.
Restriction Requirement received for U.S. Appl. No. 15/097,179, dated Sep. 28, 2017, 6 pages.
Restriction Requirement received for U.S. Appl. No. 15/691,283, dated Mar. 5, 2019, 6 pages.
Search Report received for Chinese Patent Application No. 201680008313.9, dated Jul. 5, 2019, 4 pages (2 pages English Translation and 2 pages of Official copy).
Supplemental Notice of Allowance received for U.S. Appl. No. 15/686,969, dated Feb. 21, 2020, 2 pages.
Gibilisco Stan, "The Illustrated Dictionary of Electronics", Eighth Edition, 2001, p. 173.
Lowe Doug, "Electronics Components: How to Use an Op Amp as a Voltage Comparator", Dummies, Available online at <https://www.dummies.com/programming/electronics/components/electronics-components-how-to-use-an-op-amp-as-a-voltage-comparator/>, 2012, 9 pages.
O'Connor Todd, "mTouch Projected Capacitive Touch Screen Sensing Theory of Operation", Microchip TB3064, Microchip Technology Inc., 2010, pp. 1-16.
Final Office Action received for U.S. Appl. No. 16/152,326, dated Dec. 4, 2020, 10 pages.

\* cited by examiner

TOUCH SENSING WITH WATER REJECTION

CROSS-REFERENCE TO RELATED APPLICATIONS

This application claims benefit of U.S. Provisional Patent Application No. 62/897,118, filed Sep. 6, 2019, the contents of which is hereby incorporated by reference in its entirety for all purposes.

FIELD OF THE DISCLOSURE

This relates generally to touch sensor panels, and more particularly to techniques for rejecting water droplets located near the edges of the touch sensor panels.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Touch sensor panels can include an array of touch sensors capable of detecting touches (the touching by an object such as a finger upon a touch-sensitive surface). Some touch sensor panels are able to detect multiple touches (e.g., the touching of multiple fingers upon a touch-sensitive surface at distinct locations at or about the same time) and near touches (e.g., fingers within the near-field detection capabilities of their touch sensors), and identify and track their locations.

In reality, however, not all touches detected on a touch sensor panel are intended user input. For example, water droplets on the surface of the touch sensor panel can be detected as touches. In particular, water droplets that are capacitively coupled to ground via the housing or other conductive structures within a device can appear as a touch. As a result, water droplets can result in unintended behavior by the device. This can negatively affect user experience, particularly in wet environments.

BRIEF SUMMARY OF THE DISCLOSURE

This relates generally to improving touch detection in touch sensor panels, and more particularly to techniques for rejecting apparent (but false) touches caused by objects such as water droplets located in areas with parasitic capacitive paths to ground. In some examples, these capacitive paths to ground can be found in edge areas of touch panels located near device housings, which can be grounded through the body of a user touching the housing of the device. To minimize these false touches, one or more conductors can be located in proximity to the housing and driven with a stimulation signal to shield objects from being capacitively coupled to ground through the housing. In some examples, these conductors can be newly formed in proximity to the housing. In other examples, conductors already present in the product design can be configured to serve as a guard during touch sensing, and configured to perform its original function at other times.

In addition to providing these driven conductors to act as guards against objects being capacitively coupled to ground through the housing, in some examples various scans can be provided and compared to identify and reject apparent touches resulting from capacitive coupling to ground. In some examples, a non-bootstrapped scan can be performed in one scan step, where each of the touch nodes to be sensed can be simultaneously driven by a stimulation signal and sensed to obtain an image of touch, while other touch nodes that are not to be sensed (e.g., as in a coarse scan) can be grounded or held at a mid-rail voltage or at some other voltage. Alternatively, in some examples, a non-bootstrapped scan can be performed in multiple scan steps, where the touch sensor panel can be selectively separated into one or more sensed touch nodes and one or more non-sensed touch nodes (e.g., different touch nodes can be sensed or not sensed depending on the scan step). An image of touch can be obtained from the multi-step non-bootstrapped scan, during which time (for each step) the sensed touch nodes can be driven by a stimulation signal, and the non-sensed touch nodes can be grounded or held at a mid-rail voltage or at some other voltage. In some examples, a bootstrapped scan can be performed in one scan step, where each of the touch nodes of the touch sensor panel can be simultaneously driven by a stimulation signal and sensed. Alternatively, in some examples, a bootstrapped scan can be performed in multiple scan steps, where the touch sensor panel can be selectively separated into one or more sensed touch nodes and one or more non-sensed touch nodes (e.g., different touch nodes can be sensed or non-sensed depending on the scan step). An image of touch can be obtained from the multi-step bootstrapped scan, during which time (for each step) the sensed touch nodes can be driven by a stimulation signal, and the non-sensed touch nodes can be driven with a stimulation signal that has the same characteristics as the stimulation signal being applied to the sensed touch nodes. In some examples an extended bootstrapped scan can also be performed, during which time the sensed touch nodes can be driven by a stimulation signal, and the guard conductor and the non-sensed touch nodes can be driven with a stimulation signal that has the same characteristics as the stimulation signal being applied to the sensed touch nodes. In some examples, the results of the extended bootstrapped scan can be subtracted from the non-bootstrapped scan or the bootstrapped scan to identify and reject apparent (but false) touches (e.g., water droplets) resulting from parasitic capacitive coupling to ground.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to improving touch detection in touch sensor panels, and more particularly to techniques for rejecting apparent (but false) touches caused by objects such as water droplets located in areas with parasitic capacitive paths to ground. In some examples, these capacitive paths to ground can be found in edge areas of touch panels located near device housings, which can be grounded through the body of a user touching the housing of the device. To minimize these false touches, one or more conductors can be located in proximity to the housing and driven with a stimulation signal to shield objects from being capacitively coupled to ground through the housing. In some examples, conductors already present in the product design can be configured to serve as a guard during touch sensing, and configured to perform its original function at other times.

In some examples an image of touch can be obtained from a (single or multi-step) non-bootstrapped scan, during which time sensed touch nodes can be driven by a stimulation signal, and non-sensed touch nodes can be grounded or held at a mid-rail voltage or other voltage. In some examples an image of touch can be obtained from a (single or multi-step) bootstrapped scan, during which time sensed touch nodes can be driven by a stimulation signal, and non-sensed touch nodes (if any) can be driven with a stimulation signal that has the same characteristics as the stimulation signal being applied to the sensed touch nodes. In some examples an extended bootstrapped scan can also be performed, during which time the sensed touch nodes can be driven by a stimulation signal, and the guard conductor and the non-sensed touch nodes (if any) can be driven with a stimulation signal that has the same characteristics as the stimulation signal being applied to the sensed touch nodes. In some examples, the results of the extended bootstrapped scan can be subtracted from the non-bootstrapped scan or the bootstrapped scan to identify and reject apparent (but false) touches resulting from parasitic capacitive coupling to ground.

Figure 1A:
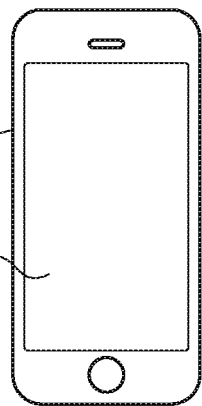
FIGS. 1A-1E illustrate touch sensing devices or systems that can include a touch screen or touch sensor panel according to examples of the disclosure.
Figure 1B:
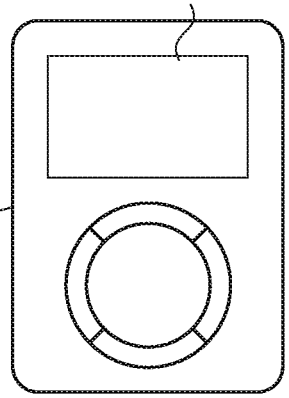
Figure 1C:
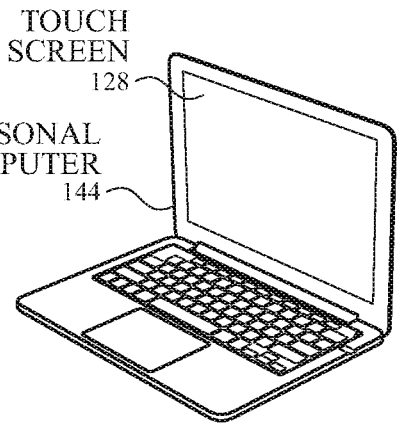
Figure 1D:
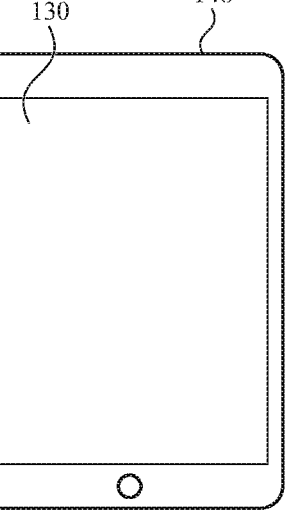
Figure 1E:
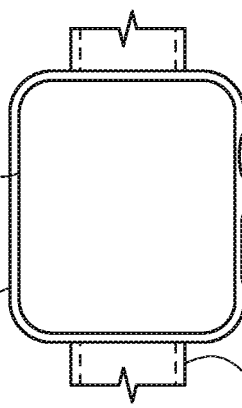

FIGS. 1A-1E illustrate touch sensing devices or systems that can include a touch screen or touch sensor panel according to examples of the disclosure. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1E can further include touch sensor panels on surfaces not shown in the figures.

In some examples, touch screens 124, 126, 128, 130 and 132 and touch sensor panels can be can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it is understood that in some examples, the touch node electrodes on the touch screen/panel can be used to perform scans other than self-capacitance scans on the touch screen/panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc.

In some examples, touch screens 124, 126, 128, 130 and 132 and touch sensor panels can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens 124, 126, 128, 130 and 132 or touch sensor panels can be based on mutual capacitance and/or self-capacitance. The electrodes can be arranged as a matrix of small, individual plates of conductive material (e.g., as in touch node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
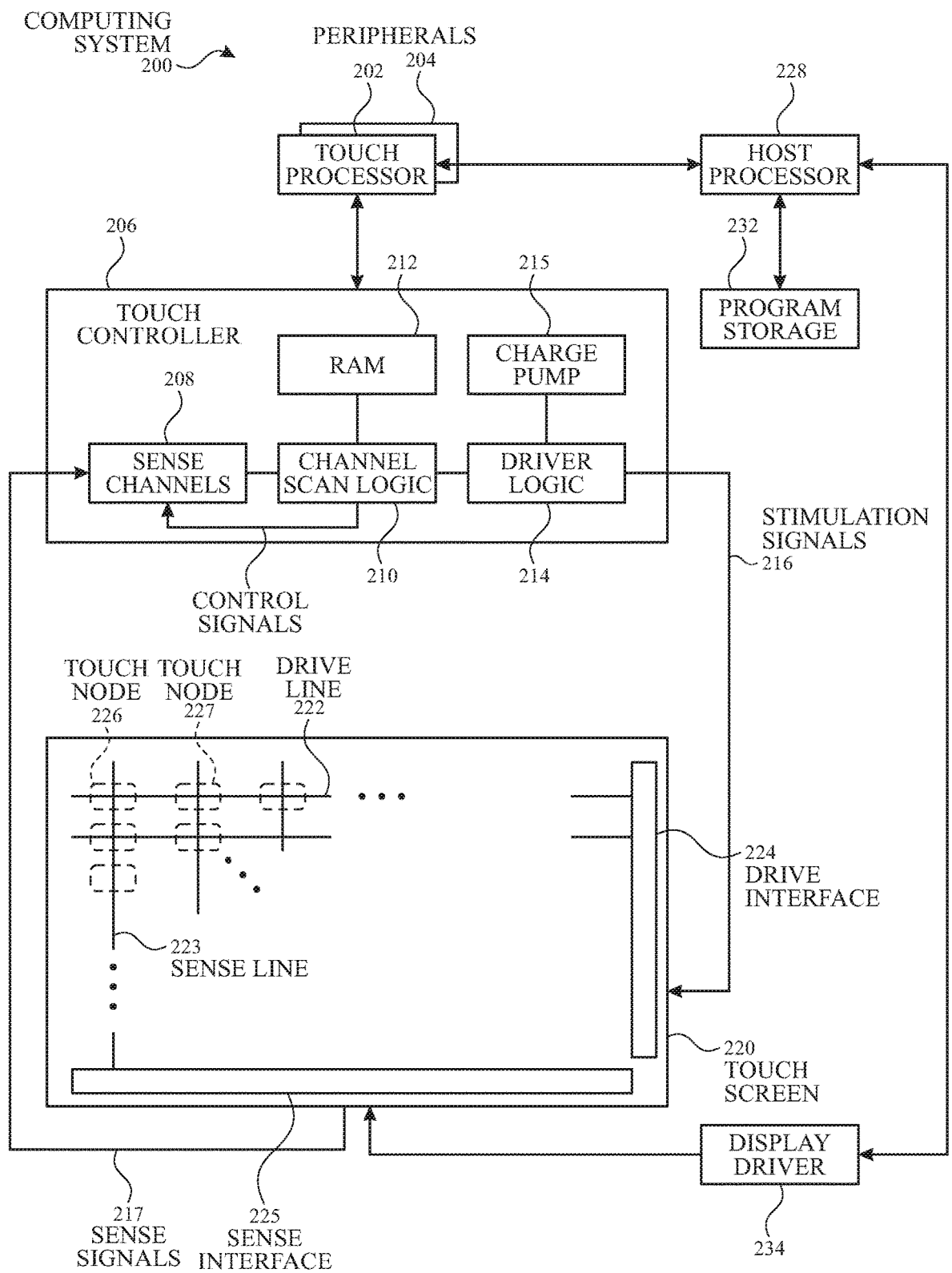
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
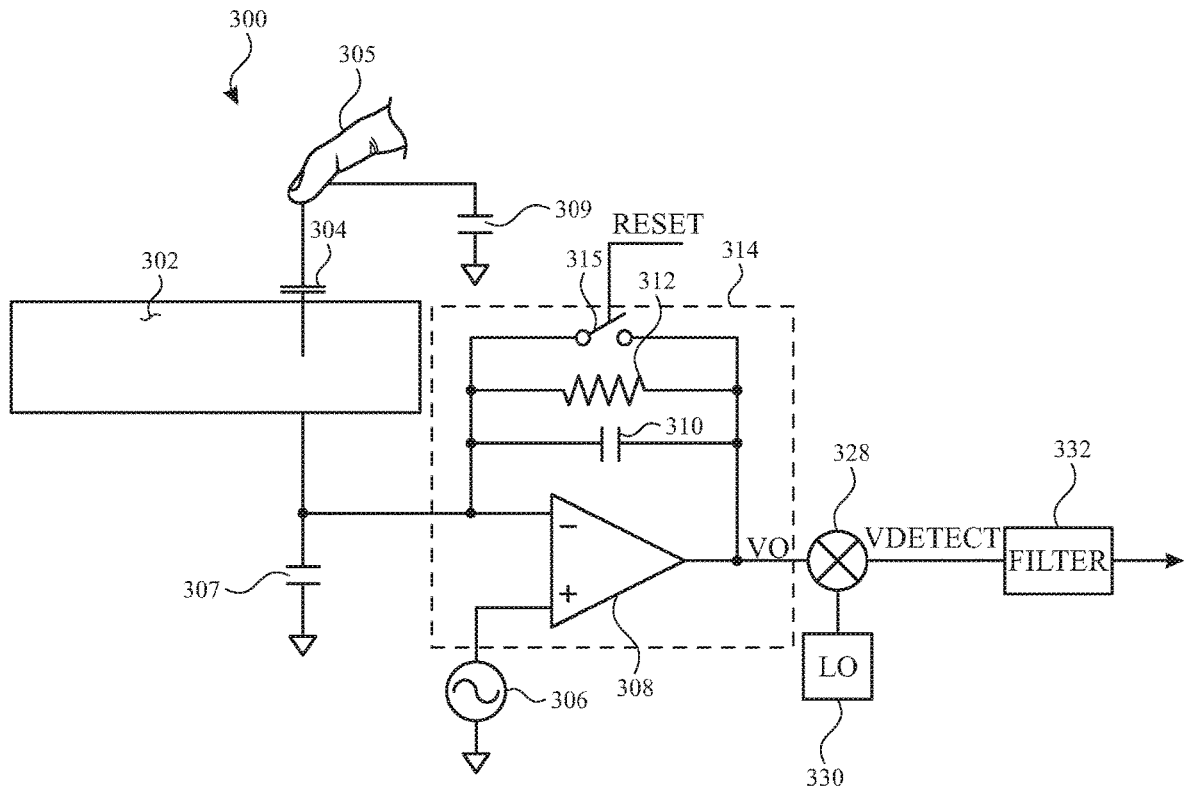
FIG. 3A illustrates a touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen/panel 400 or a touch node electrode 408 of touch screen/panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
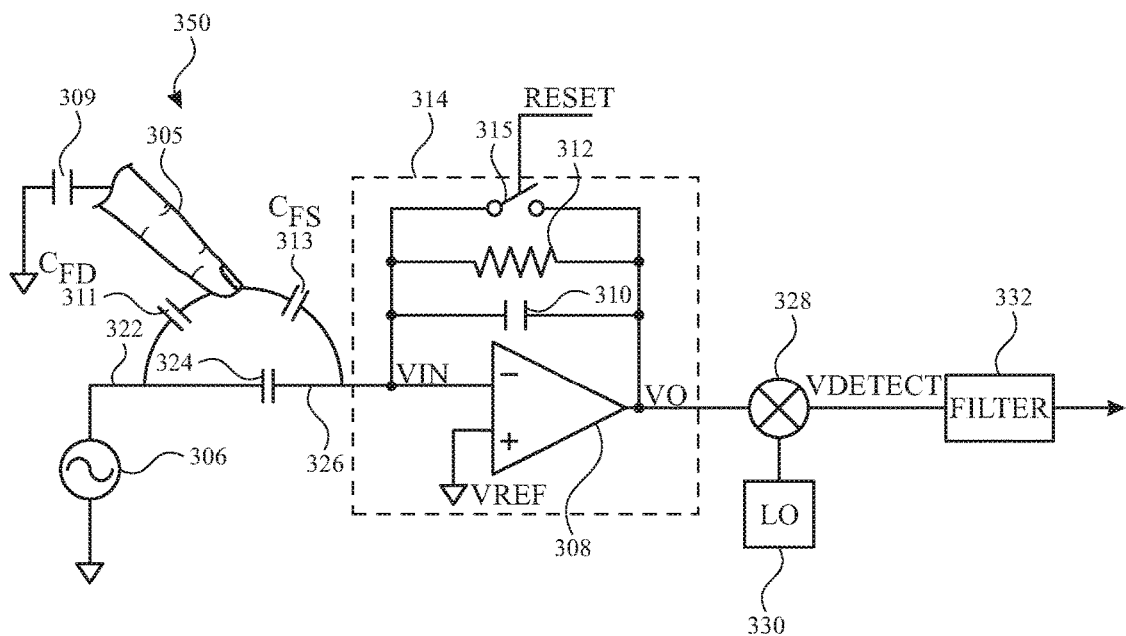
FIG. 3B illustrates a touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
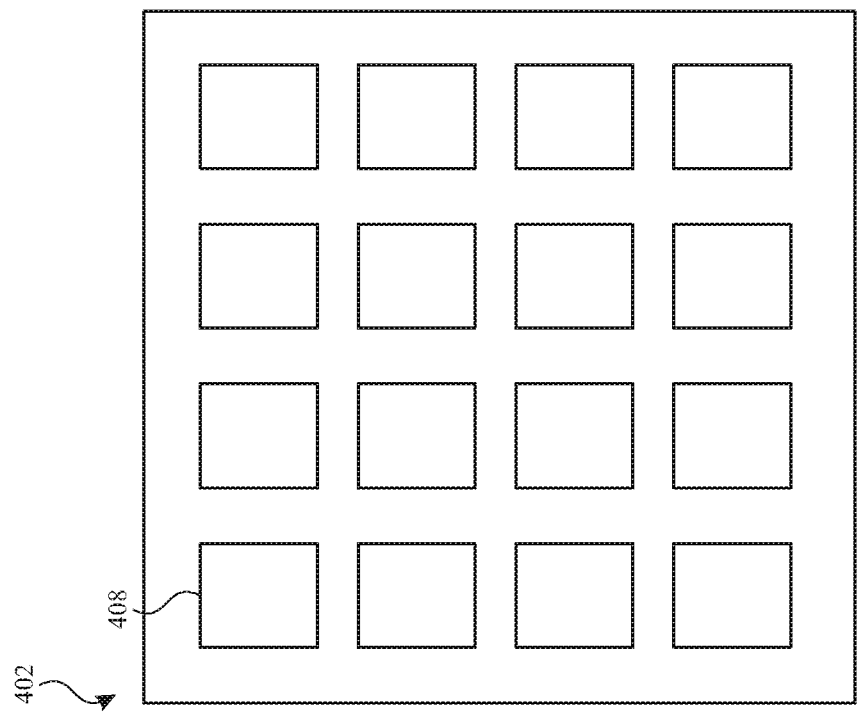
FIG. 4B illustrates a touch screen or touch sensor panel with touch node electrodes arranged in a pixelated touch node electrode configuration according to examples of the disclosure.
Figure 4A:
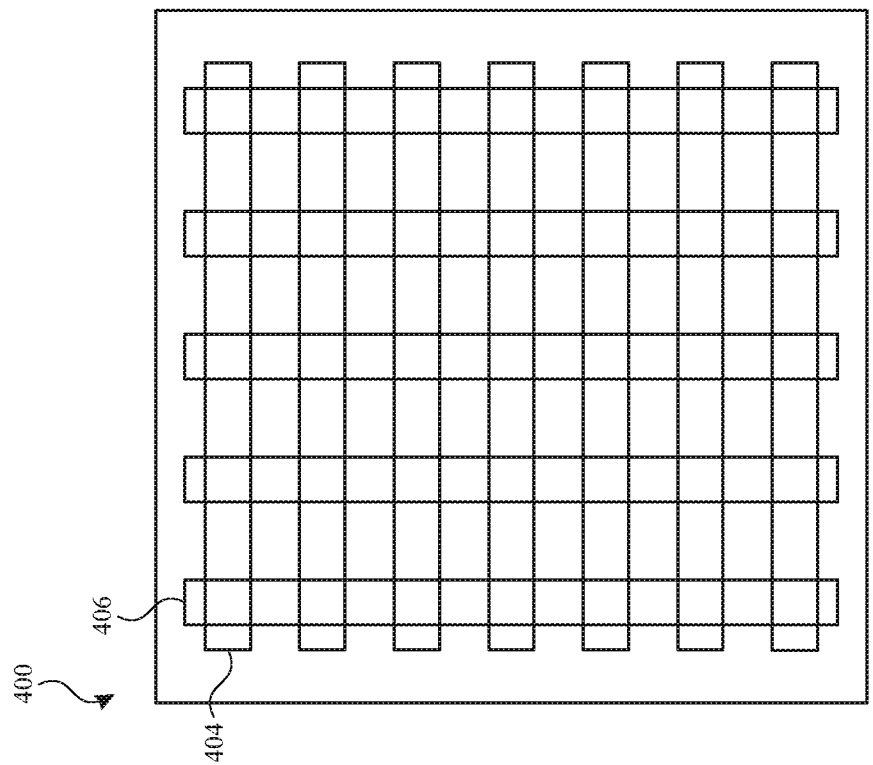
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch node electrodes 408 arranged in a pixelated touch node electrode configuration according to examples of the disclosure. Specifically, touch screen/panel 402 can include a plurality of individual touch node electrodes 408, each touch node electrode identifying or representing a unique location on the touch screen/panel at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen/panel 402. In some examples, touch screen/panel 402 can sense the self-capacitance of touch node electrodes 408 to detect touch and/or proximity activity on touch screen/panel 402, and in some examples, touch screen/panel 402 can sense the mutual capacitance between touch node electrodes 408 to detect touch and/or proximity activity on touch screen/panel 402.

Figure 4C:
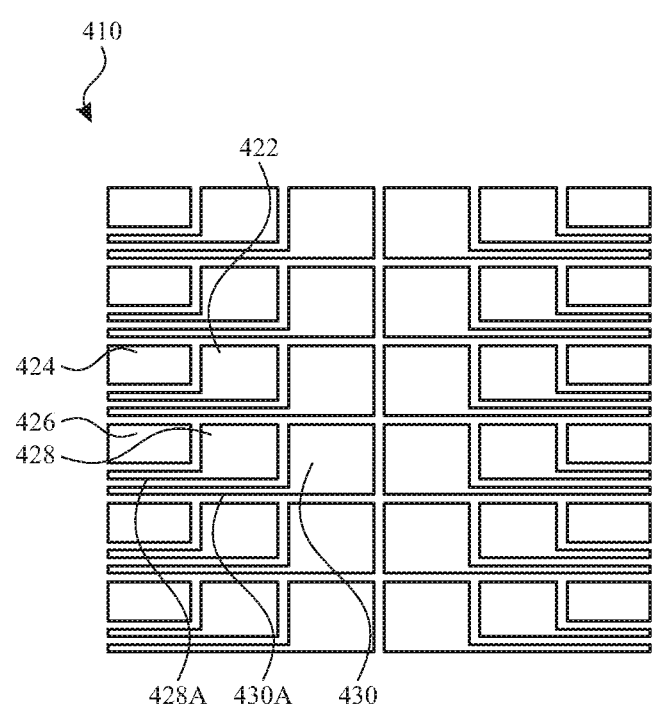
FIG. 4C illustrates a touch screen or touch sensor panel with touch node electrodes and corresponding routing arranged in a pixelated touch node electrode configuration according to examples of the disclosure.

FIG. 4C illustrates a touch screen or touch sensor panel 410 with touch node electrodes (e.g., including touch node electrodes 422, 424, 426, 428 and 430) and corresponding routing (e.g., including routing 428A and 430A) arranged in a pixelated touch node electrode configuration according to examples of the disclosure. Touch screen/panel 410 can be similar to touch screen/panel 402, but can also illustrate corresponding routing of the touch node electrodes. Specifically, touch screen/panel 410 can include a plurality of individual touch node electrodes, each touch node electrode identifying or representing a unique location on the touch screen/panel at which touch or proximity (i.e., a touch or proximity event) is to be sensed, and each touch node electrode being electrically isolated from the other touch node electrodes in the touch screen/panel, as previously described. The touch nodes can be routed to edges of the touch screen/panel 410 (and from the edges of the touch screen/panel 410 to touch controller 206). For example, touch node electrode 428 can be routed to the edge of touch screen/panel 410 via routing trace 428A and touch node electrode 430 can be routed to the edge of touch screen/panel 410 via routing trace 430A. The touch node electrodes and routing can be on the same material layer (as shown) or on different material layers (e.g., routing can be achieved via a different layer connected with vias) of touch screen/panel 410. In some examples, touch screen/panel 410 can sense the self-capacitance of the touch node electrodes or the mutual capacitance between the touch node electrodes to detect touch and/or proximity activity on touch screen/panel 410.

Figure 5:
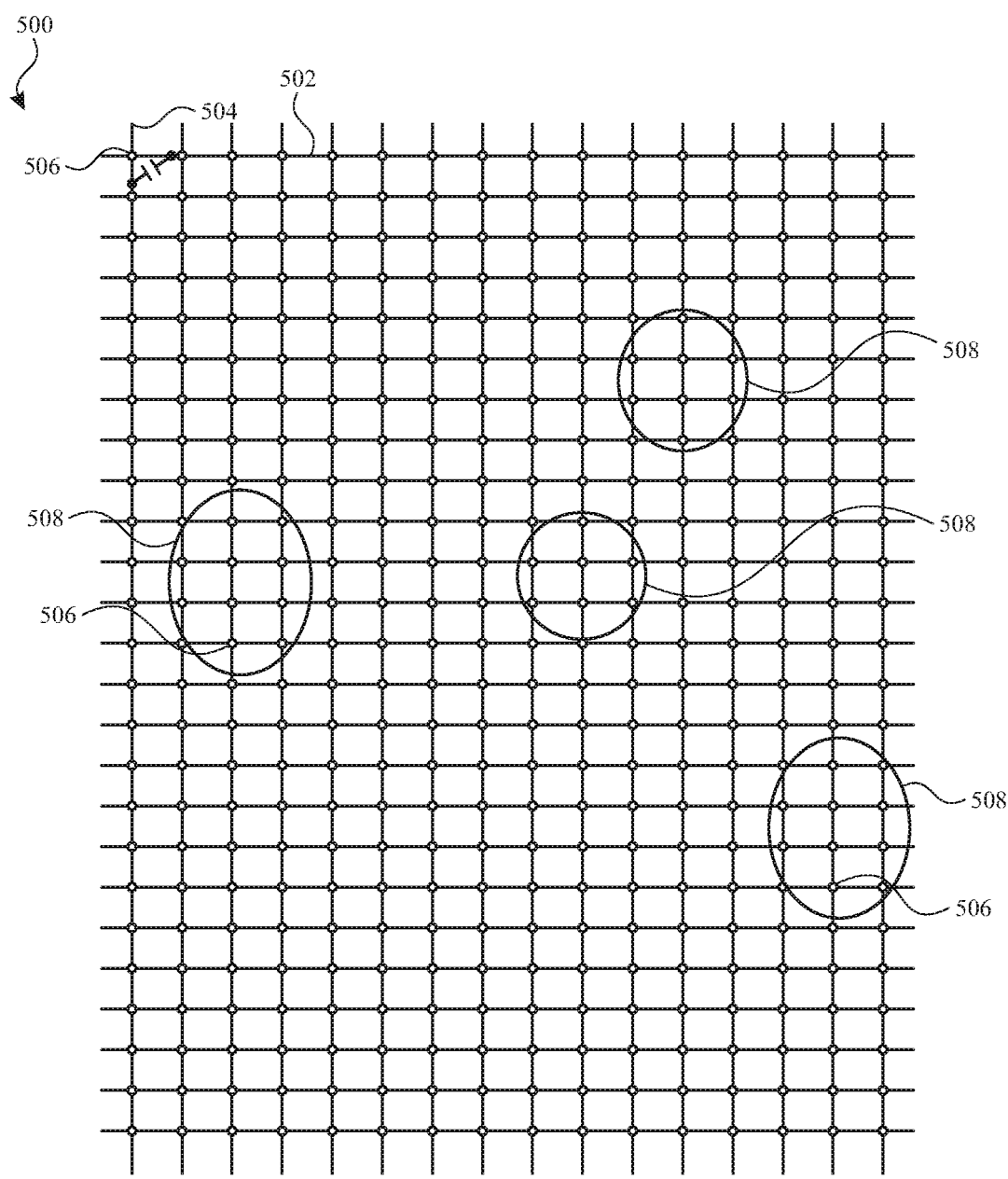
FIG. 5 illustrates a representation of an image of touch according to examples of the disclosure.

FIG. 5 illustrates a representation of an image of touch according to examples of the disclosure. Touch screen/panel 500 can include drive lines 502 and sense lines 504 arranged as a pattern of rows and columns, although other patterns can be possible. Touch nodes 506 can be formed at the intersection between drive lines 502 and sense lines 504, and the mutual capacitance (or change in mutual capacitance) therebetween can be measured. Each object touching or proximate to, but not touching, the touch screen/panel 500 can produce a touch signal at proximate touch nodes 506. By processing the touch image, touch signals from proximate touch nodes 506 (e.g., those touch signals meeting a threshold signal level) can be grouped together to form input patches 508. Thus, the input patches 508 can be regions within the image of touch corresponding to touch nodes 506 having signal values produced by an object touching (or proximate to, but not touching, in some examples) the touch screen/panel 500. The input patches identified in a touch image can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

As discussed above, a touch sensor panel can detect objects in contact with, or in proximity to, a touch surface. In capacitive touch sensor panels, the effect of capacitive coupling of the object with touch electrodes in the touch sensor panel can be detected by touch sensing circuitry. If the effect of the capacitive coupling is significant enough, the touch sensing circuitry can determine that a touch has occurred. In general, an object such as finger or stylus that is well-grounded can result in more charge being capacitively coupled from a touch node (in self-capacitance touch sensing systems) or a drive line (in mutual capacitance touch sensing systems) to the object, and then from the object to ground, than an object that is poorly grounded. In self-capacitance systems, this capacitive coupling can increase the touch node's self-capacitance to ground, while in mutual capacitance systems, this capacitive coupling can decrease the mutual capacitance between drive and sense lines. In either system, a well-grounded object is more likely to be recognized as a touch.

However, objects such as fingers and styli are not the only objects that can come into contact with a touch surface. For example, water droplets on a touch surface can exhibit characteristics similar to a finger or stylus, and can sometimes be erroneously recognized as an intended touch. When water droplets form in isolation on the surface of a touch sensor panel, they are generally floating with respect to ground or otherwise poorly grounded, and may not appear as a touch. However, water droplets near the edge of a touch sensor panel can be located close enough to a device housing such that significant capacitive coupling between the droplet and the housing can occur. Because the housing can be couplable to ground via a user's body, for example, the water droplets themselves can be grounded through the housing, and can erroneously be recognized as an intended touch. As a result, water can result in unintended behavior by the device, negatively affecting the user experience. (Note that although this disclosure may explicitly mention only water droplets for purposes of brevity, the scope of the disclosure is not so limited. References to water droplets herein are intended to be inclusive of other conductive substances such as oil, liquids, beverages and the like.)

In some examples, floating water droplets or partially grounded water droplets (e.g., droplets capacitively coupled to ground) can interfere with the accurate detection of intended user input such as a touchdown or a liftoff of an object (e.g., a finger). In some examples, floating or partially grounded water can interfere with the detection of a swipe gesture or cause a swipe gesture to be unintentionally canceled. In some examples, floating or partially grounded water can merge with an object (e.g., a finger) and cause offsets in centroid detection (creating unwanted jitter in the touch sensing system performance). In some examples, small droplets of water along the edges of a touch sensor panel can be detected as false taps or swipes, for example.

Figure 6:
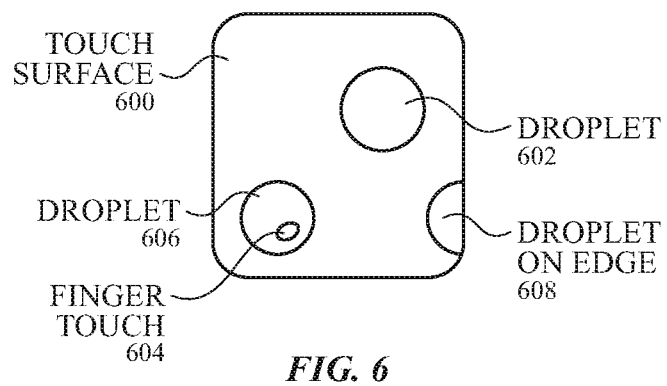
FIG. 6 illustrates a representation of water droplets occurring in different areas on a touch surface according to examples of the disclosure.

FIG. 6 illustrates a representation of water droplets occurring in different areas on a touch surface according to examples of the disclosure. In the example of FIG. 6, water droplet 602 appearing on an interior area of touch surface 600 can be ungrounded or poorly grounded and can be ignored as a touch (e.g., because the capacitive signal can be below a touch detection threshold). However, when a grounded finger or stylus contacts touch surface 600 at point 604 and makes contact with otherwise poorly grounded water droplet 606, a capacitive path to ground can develop from the water droplet to ground through the grounded object. As a result, water droplet 606 can appear to be part of the touching object, and touch detection accuracy can be reduced. In addition, when water droplet 608 at the edge of touch surface 600 capacitively couples to a grounded housing, bezel, or other grounded conductor, a capacitive path to ground can develop from the water droplet to ground through the grounded housing, bezel or conductor. As a result, water droplet 608 can appear to be a touching object, and device operations can be adversely impacted.

Note that although the problem of water droplets being capacitively coupled to ground and appearing to be an intended touch was described above with respect to a grounded housing, bezel or conductor, the problem can occur whenever a grounding path is present. For example, grounded conductors (such as grounded non-sensed touch nodes) within the interior area of the device can also produce enough capacitive coupling with the water droplet to cause the droplet to register as an intended touch.

To reduce the negative effects of parasitic capacitive paths to ground in touch sensor panels, non-sensed touch nodes (if any) can be driven with a stimulation signal that has the same characteristics as the stimulation signal being applied to the sensed touch nodes. In some examples, a scan can be performed in one scan step, where each of the touch nodes of the touch sensor panel can be simultaneously driven by a stimulation signal and sensed. In other examples, a scan can be performed in multiple scan steps, where the touch sensor panel can be selectively separated into one or more sensed touch nodes and one or more non-sensed touch nodes (e.g., different touch nodes can be sensed or non-sensed depending on the scan step). Note that although examples of the disclosure may merely mention the driving of sensed and non-sensed touch nodes for purposes of brevity, it should be understood that this includes performing these scans in single or multiple steps. By bootstrapping the non-sensed touch nodes in this manner, the capacitive coupling between the sensed touch nodes and nearby non-sensed touch nodes (if any) can be greatly reduced. The non-sensed touch nodes can act as guards or shields to reduce the parasitic capacitive coupling between the sensed touch nodes and ground, which can serve to reduce the effect of noise on the sensed touch nodes. This bootstrapping technique can also cause floating water droplets to capacitively couple to the driven touch nodes instead of to ground, which reduces the likelihood that those droplets will be interpreted as intended touches. However, other objects, such as a finger, which can be grounded through other paths (such as through the user's body), can be unaffected (or be negligibly affected) by the stimulation applied to the non-sensed touch nodes. As a result, the guarded scan image (a bootstrapped image) can capture finger touches and exclude floating water.

On the other hand, a non-guarded scan image (a non-bootstrapped image) can be generated by applying the stimulation signal to the sensed touch nodes while grounding or applying a mid-rail voltage or other voltage to the non-sensed touch nodes. As a result, objects such as floating water can be capacitively coupled to ground via the non-sensed touch nodes. Thus, the non-guarded scan image can capture both fingers and floating water, because both can be grounded (or have a relatively low impedance path to ground). Taking a difference between the guarded and non-guarded scan images can result in an image that includes floating water droplets but excludes touches from well-grounded objects (e.g., fingers, styli, etc.). The identified water droplets can then be removed from subsequent touch image processing.

Although the use of guarded scans can reduce the capacitive coupling of a water droplet to ground in the interior regions of a touch screen or touch sensor panel, capacitive paths to ground can still exist at the edges of the touch screen/panel, where no guarded non-sensed touch nodes may be present. For example, a droplet can capacitively couple to ground through the housing of a device, if the housing is in contact with a grounded user. Additionally or alternatively, a droplet can capacitively couple to ground through another grounded conductor near the edge of the touch screen/panel that is not guarded by a driven non-sensed touch node. These paths to ground can be reduced if a guarded conductor, driven with a stimulation signal that has the same characteristics as the stimulation signal being applied to the sensed touch nodes, can be positioned to at least partially cover and guard or shield the grounded housing.

Figure 7A:
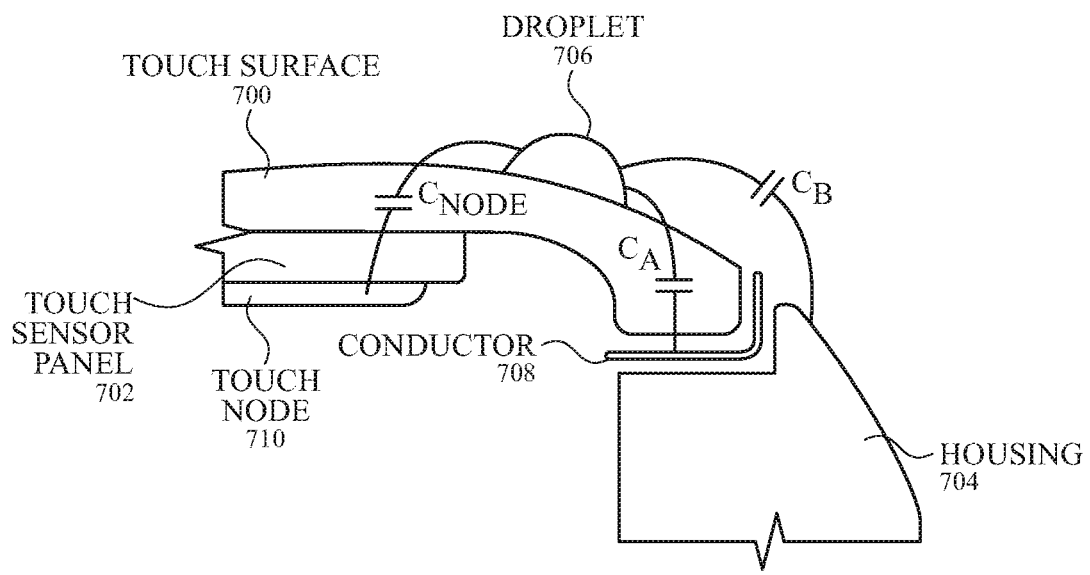
FIG. 7A illustrates a guarded conductor between a touch surface or substrate and a housing according to examples of the disclosure.

FIG. 7A illustrates a guarded conductor 708 located between a touch surface or substrate 700 and a housing 704 according to examples of the disclosure. In the example of FIG. 7A, a portion of touch surface or substrate 700 (i.e., a cover glass, crystal, plastic, etc.) attached to underlying touch sensor panel 702 can be assembled in close proximity to housing 704. Touch nodes 710 can be formed in touch sensor panel 702 in proximity to touch surface 700 to create an active touch area, and can be configurable to be driven with stimulation signals. Touch nodes 710 can be selectively separable into one or more sensed touch nodes (i.e., those touch nodes whose touch signals are being measured) and one or more non-sensed touch electrodes (i.e., these touch nodes whose touch signals are not being measured). In some examples, each touch node in the touch sensor panel can be sensed simultaneously.

When housing 704 is grounded (e.g., the housing can be couplable to ground through a user's body), capacitance $C_B$ can form between water droplet 706 and the housing 704. In the example of FIG. 7A, at least a portion of conductor 708 can be disposed partially or fully between touch surface or substrate 700 and housing 704, outside or beyond the active touch area. Conductor 708 can be distinct from the touch nodes, electrically insulated from the housing, and configurable to be driven (e.g., during touch sensing) with a stimulation signal that has the same characteristics as the stimulation signal being applied to some of the touch nodes. For example, conductor 708 may receive a stimulation signal that has the same amplitude, frequency and phase as a stimulation signal being applied to non-sensed touch nodes, though not generated from exactly the same source output as the stimulation signal being applied to the non-sensed touch nodes. In this manner, capacitance CA can form between droplet 706 and conductor 708, instead of (or reducing the amount of capacitive coupling) between droplet 706 and the grounded housing 704. Because conductor 708 is biased at the same potential as the sensed touch nodes and not to ground, less charge is coupled between the droplet to ground. This can result in less charge coupling between touch node 710 to droplet 706, which in turn results in a smaller change in the touch signal appearing at touch node 710, and a reduced likelihood of the apparent (but false) touch being detected as intended touch.

In various non-limiting examples, conductor 708 can be alternatively formed as a flex circuit, deposited onto touch surface or substrate 700 or (indirectly) onto housing 704, or formed within a gasket, as long as the conductor is insulated from ground. Note that although the example of FIG. 7A shows conductor 708 extending along the full length of the gap between touch surface or substrate 700 and housing 704, in other examples the conductor can only partially extend along the gap, with diminished effectiveness but with the potential benefit of easier and lower cost fabrication and assembly.

Figure 7B:
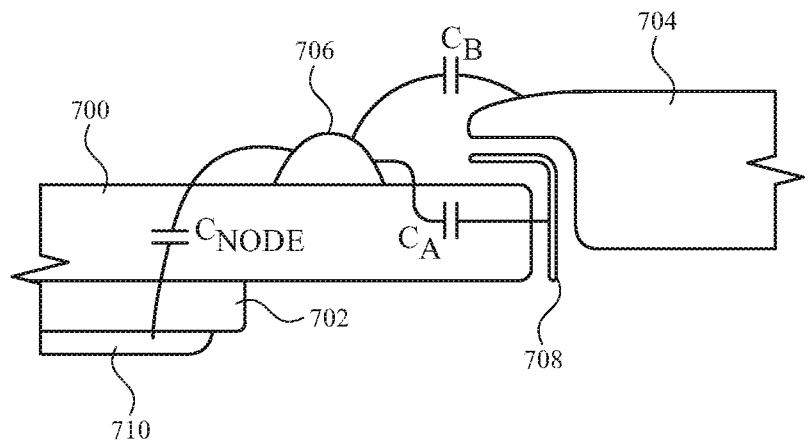
FIG. 7B illustrates another guarded conductor between a touch surface or substrate and a housing according to examples of the disclosure.

FIG. 7B illustrates another guarded conductor 708 between touch surface or substrate 700 and housing 704 according to examples of the disclosure. The example of FIG. 7B is similar to that of FIG. 7A, albeit with a different configuration of touch surface or substrate and housing.

Figure 7C:
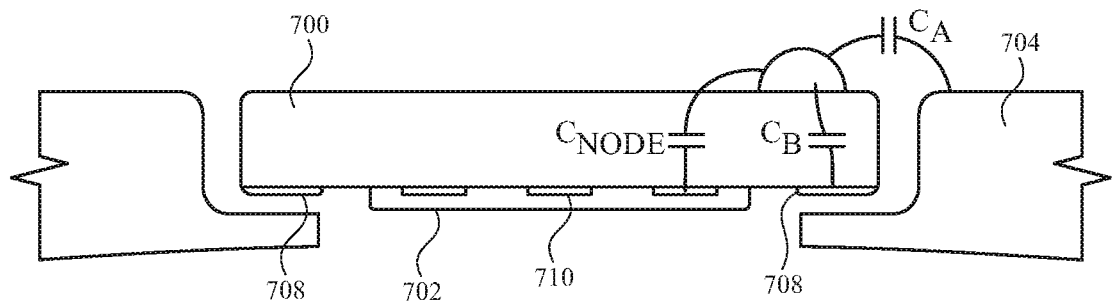
FIG. 7C illustrates another guarded conductor between a touch surface or substrate and a housing according to examples of the disclosure.

FIG. 7C illustrates another guarded conductor 708 between touch surface or substrate 700 and housing 704 according to examples of the disclosure. In the example of FIG. 7C, conductor 708 can be formed on the same side of touch surface or substrate 700 as touch nodes 710, and can even be formed in the same layer as the touch nodes, which can result in lower cost fabrication and assembly. In another example, conductor 708 can be an extension of a driven shield layer on the underside of touch surface or substrate 700. In other examples, conductor 708 can be formed on touch sensor panel 702 to perform other functions, but can be driven with a stimulation signal to serve as a guarded conductor during touch sensing.

Figure 7D:
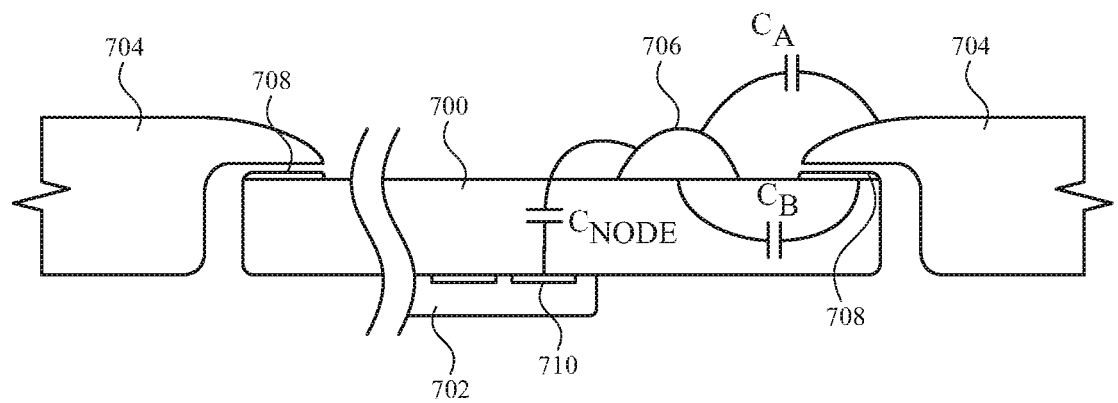
FIG. 7D illustrates another guarded conductor between a touch surface or substrate and a housing according to examples of the disclosure.

FIG. 7D illustrates another guarded conductor between touch surface or substrate 700 and housing 704 according to examples of the disclosure. The example of FIG. 7D is similar to that of FIG. 7C, albeit with a different configuration of touch surface or substrate and housing. In the example of FIG. 7D, conductor 708 can be formed on top of touch surface or substrate 700, which can result in lower cost fabrication and assembly. In other examples, conductor 708 can be formed on the top of touch surface or substrate 700 to perform other functions, but can be driven with a stimulation signal to serve as a guarded conductor during touch sensing.

As noted above, in some examples of the disclosure, rather than adding a new driven conductor, existing conductors can be configured to be multi-functional and driven with a stimulation signal at selected times (e.g., during touch sensing) to achieve a similar effect as a new driven conductors.

Figure 8A:
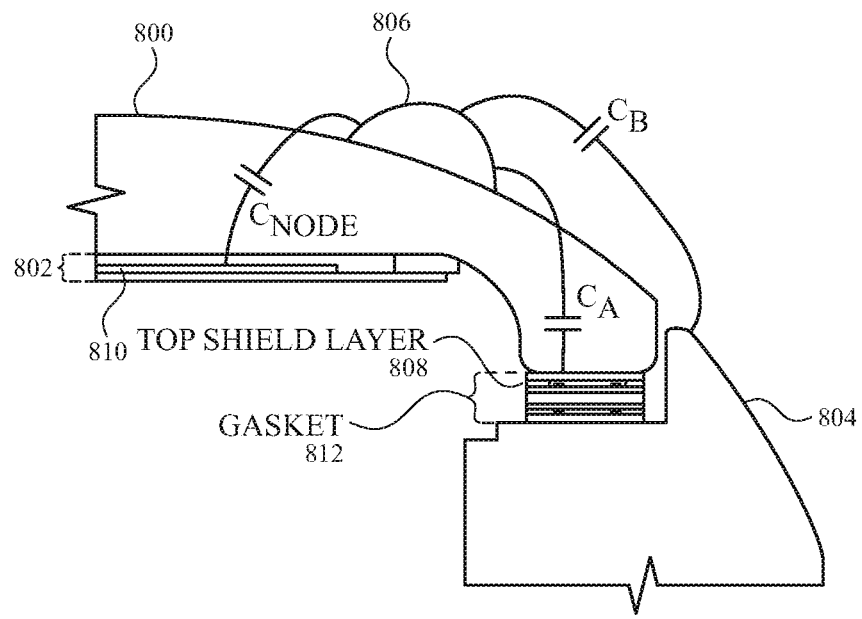
FIG. 8A illustrates a gasket which includes a guarded conductor between a touch surface or substrate and a housing according to examples of the disclosure.

FIG. 8A illustrates gasket 812 which includes guarded conductor 808 installed between touch surface or substrate 800 and housing 804 according to examples of the disclosure. In the example of FIG. 8A, a portion of touch surface or substrate 800 attached to an underlying touch sensor panel 802 can be assembled in close proximity to housing 804. In some examples, gasket 812 can be installed between at least a portion of touch surface or substrate 800 and housing 804. In some examples, gasket 812 can perform the function of environmentally sealing the interior of the device. In some examples, gasket 812 can include force sensing layers to detect force being applied to touch surface or substrate 800. In some examples, gasket 812 can further include top shield layer 808 to shield the force sensing layers. In some examples, this top shield layer 808 is configurable and can be biased at a particular potential (e.g., grounded) during certain modes of operation (e.g., force sensing).

When water droplet 806 is present on touch surface or substrate 800, a capacitance $C_B$ can form between the droplet and housing 804, particularly if the housing is grounded. A capacitance $C_{NODE}$ can also form between droplet 806 and touch node 810. If top shield layer 808 is grounded during touch sensing, it would provide another undesirable (parasitic) capacitive path CA to ground, and could be another contributor to the total capacitance to ground seen by droplet 806.

However, according to some examples of the disclosure, during touch sensing top shield layer 808 can instead be driven with a stimulation signal that has the same characteristics as the stimulation signal being applied to the sensed touch nodes. In this manner, capacitance CA can form between droplet 806 and top shield layer 808, instead of between droplet 806 and grounded housing 804. Because top shield layer 808 is biased at the same potential as the sensed touch nodes and not to ground, less charge is coupled from the droplet to ground through housing 804 (though capacitance $C_B$ may still be present). This can result in less charge coupling from touch node 810 to droplet 806, which in turn results in a smaller change in the touch signal appearing at touch node 810, and a reduced likelihood of the apparent (but false) touch being detected as intended touch. In essence, top shield layer 808 can be either grounded or driven with the stimulation signal to serve two different shielding functions at different times.

Figure 8B:
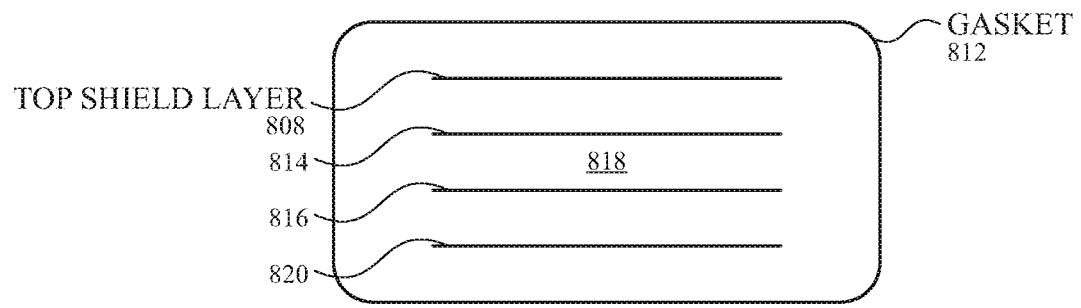
FIG. 8B illustrates a gasket according to examples of the disclosure.

FIG. 8B illustrates gasket 812 according to examples of the disclosure. In the example of FIG. 8B, gasket can include top shield layer 808, force sensing layers 814 and 816 separated by flexible dielectric material 818, and lower shield layer 820. As described above, in some examples top shield layer 808 can be grounded during force sensing, and driven with a stimulation signal that has the same characteristics as the stimulation signal being applied to the sensed touch nodes. However, in other examples, any of the other layers of gasket 812 can be alternatively or additionally driven with the stimulation signal, as long as no layer is grounded and is exposed to the droplet without an intervening driven layer. For example, layer 816 could be used as the stimulated layer, as long as layers 808 and 814 were floated and not grounded. It should be understood that the stackup of FIG. 8B is only exemplary, and that gaskets having fewer or different conductive layers can also be employed.

In various examples, driving top shield layer 808 or any of the other conductive layers in gasket 812 with a stimulation signal that has the same characteristics as the stimulation signal being applied to the sensed touch nodes during touch sensing may require that those conductors be configurable under program control (e.g., by host processor 228, touch controller 206, etc.) to be driven with different signals at different times. In such examples, the layers of gasket 812 may be connected to a touch controller circuit to implement these different configurations. In the examples of FIGS. 8A and 8B, touch sensing can be time-multiplexed with force sensing, so that force sensing can be performed with gasket 812 (with top shield layer 808 grounded, for example), and touch sensing can be performed (with top shield layer being stimulated, for example) during non-overlapping times.

Figure 9A:
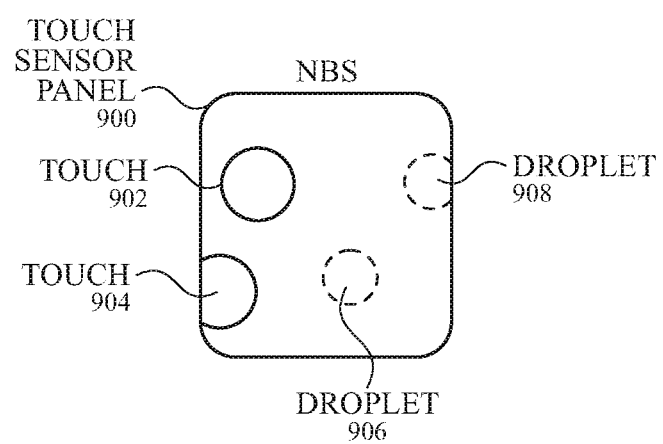
FIG. 9A illustrates a touch sensor panel with a finger touch in the inner area of the touch sensor panel, a finger touch in an edge area of the touch sensor panel, a water droplet in the inner area of the touch sensor panel, and a water droplet in the edge area of the touch sensor panel, where a non-bootstrapped (NBS) scan is being performed according to examples of the disclosure.

FIG. 9A illustrates touch sensor panel 900 with finger touch (patch) 902 in an inner area of the touch sensor panel, finger touch (patch) 904 in an edge area of the touch sensor panel, water droplet (patch) 906 in the inner area of the touch sensor panel, and water droplet (patch) 908 in the edge area of the touch sensor panel according to examples of the disclosure. In the example of FIG. 9A, touches are represented symbolically with solid line circles, and droplets are represented symbolically with dashed line circles, where the size of the circles is intended to represent the strength or magnitude of the touch signals, and not the area of the touch or droplet. In the example of FIG. 9A, touch sensor panel 900 is being subjected to a non-bootstrapped (NBS) scan, where sensed touch nodes are driven with a stimulation signal, and non-sensed touch nodes are grounded or held at a mid-rail voltage or other fixed voltage. Because finger touches 902 and 904 are well-grounded, they can register as strong touches (e.g., touch signals exceeding a particular threshold). Droplet 906 may be otherwise floating, but because the non-sensed electrodes are grounded (or held at a fixed voltage), droplet 906 can be capacitively coupled to ground through those non-sensed electrodes (if any) and can register as a moderate touch (e.g., touch signals within a particular threshold range below the strong touch threshold) relative to the finger touches. Droplet 908 may also be otherwise floating, but because the non-sensed electrodes are grounded (or held at a fixed voltage) and droplet 908 can be capacitively coupled to ground through a nearby grounded housing, droplet 908 can also register as a moderate touch.

Figure 9B:
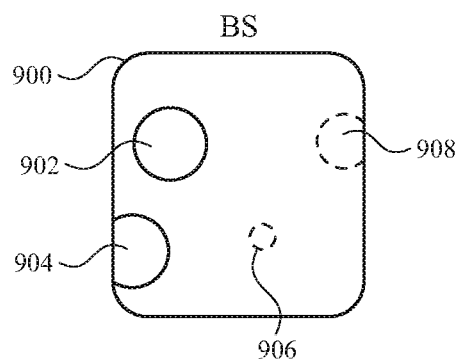
FIG. 9B illustrates the touch sensor panel of FIG. 9A, except that in FIG. 9B, the touch sensor panel is performing a bootstrapped (BS) scan according to examples of the disclosure.

FIG. 9B illustrates the touch sensor panel 900 of FIG. 9A, except that in FIG. 9B, the touch sensor panel is performing a bootstrapped (BS) scan according to examples of the disclosure. In a BS scan, sensed touch nodes are driven with a stimulation signal, and non-sensed touch nodes (if any) are also driven with a stimulation signal that has the same characteristics as the stimulation signal being applied to the sensed touch nodes. Because finger touches 902 and 904 are well-grounded, they can register as strong touches. Droplet 906 may be otherwise floating, but because the non-sensed electrodes (if any) are stimulated rather than grounded, droplet 906 may not be capacitively coupled to ground (or may be weakly capacitive coupled to ground) and can register as a very slight touch or no touch at all (e.g., touch signals below the threshold range of a moderate touch) relative to the finger touches. Droplet 908 is also floating, but because droplet 908 is capacitively coupled to ground through the nearby grounded housing, droplet 908 can register as a moderate touch.

Figure 9C:
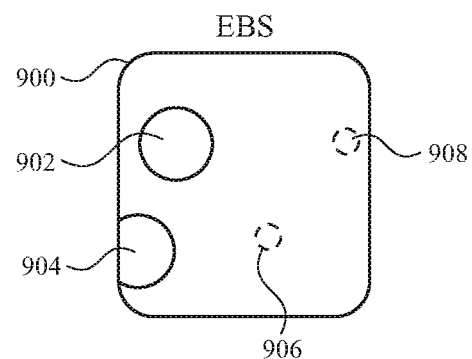
FIG. 9C illustrates the touch sensor panel of FIGS. 9A and 9B, except that in FIG. 9C, the touch sensor panel is performing an extended bootstrapped (EBS) scan according to examples of the disclosure.

FIG. 9C illustrates the touch sensor panel 900 of FIGS. 9A and 9B, except that in FIG. 9C, the touch sensor panel is performing an extended bootstrapped (EBS) scan according to examples of the disclosure. In an EBS scan, sensed touch nodes are driven with a stimulation signal, non-sensed touch nodes (if any) are also driven with a stimulation signal that has the same characteristics as the stimulation signal being applied to the sensed touch nodes, and a conductor near the housing is also driven with a stimulation signal that has the same characteristics as the stimulation signal being applied to the sensed touch nodes. This conductor can be any of the example conductors illustrated in FIGS. 7A-7D and 8A-8B. Because finger touches 902 and 904 are well-grounded, they can register as strong touches. Droplet 906 may be otherwise floating, but because the non-sensed electrodes (if any) are stimulated, droplet 906 may not be (or may weakly be) capacitively coupled to ground and can register as a very slight touch, or no touch at all. Droplet 908 may also be otherwise floating, but because the non-sensed electrodes and also the conductor are driven with the stimulation signal, droplet 908 may not be (or may weakly be) capacitively coupled to ground and can register as a very slight touch or no touch at all.

As FIGS. 9A-9C illustrate, different types of scans can enable the touch sensing system to identify touch signals or input patches meeting one or more characteristics that can indicate the presence of floating water droplets, and also water droplets that are capacitively coupled to ground. In one example, a comparison of FIGS. 9A and 9B can reveal differences between the NBS and BS scans. In particular, the touch signals corresponding to droplet 906 are stronger in FIG. 9A due to the grounded non-sensed touch nodes providing a capacitive path to ground for droplet 906, and weaker in FIG. 9B due to the non-sensed touch nodes being driven by a stimulation signal that has the same characteristics as the stimulation signal being applied to the sensed touch nodes. Thus, the NBS-BS comparison can indicate the presence of floating water droplets, particularly those floating water droplets that are capacitively coupled to ground primarily through non-sensed touch nodes, and not through other paths such as a grounded (or fixed voltage) shield layer in a gasket, for example.

In another example, a comparison of FIGS. 9A and 9C can reveal differences between the NBS and EBS scans. In particular, the touch signals corresponding to droplet 908 are stronger in FIG. 9A due to the grounded (or fixed voltage) shield layer in the gasket providing a capacitive path to ground for droplet 908, and weaker in FIG. 9C due to the shield layer in the gasket being driven by a stimulation signal that has the same characteristics as the stimulation signal being applied to the sensed touch nodes. The touch signals corresponding to droplet 906 are stronger in FIG. 9A due to the grounded (or fixed voltage) non-sensed touch nodes providing a capacitive path to ground for droplet 906, and weaker in FIG. 9C due to the non-sensed touch nodes being driven by a stimulation signal that has the same characteristics as the stimulation signal being applied to the sensed touch nodes. Thus, the NBS-EBS comparison can indicate the presence of floating water droplets, particularly those floating water droplets that are capacitively coupled to ground through non-sensed touch nodes or a shield layer in a gasket, for example. In another example, a comparison of FIGS. 9B and 9C can reveal differences between the BS and EBS scans. In particular, the touch signals corresponding to droplet 908 are stronger in FIG. 9B due to the grounded (or fixed voltage) shield layer in the gasket providing a capacitive path to ground for droplet 908, and weaker in FIG. 9C due to the shield layer in the gasket being driven by a stimulation signal that has the same characteristics as the stimulation signal being applied to the sensed touch nodes. Thus, the BS-EBS comparison can indicate the presence of floating water droplets, particularly those floating water droplets that are capacitively coupled to ground primarily through paths such as a grounded (or fixed voltage) shield layer in a gasket, for example.

Therefore, in one example, by subtracting the touch image generated from the EBS scan from the touch image generated from the NBS scan, only the touch signals associated with droplets 906 and 908 remain, and it can be determined that the touch signals associated with droplets 906 and 908 in FIG. 9A should be excluded as false touches caused by the capacitive paths to ground through grounded (or fixed voltage) non-sensed touch nodes, a grounded shield layer in a gasket, or a grounded housing, for example. In another example, by subtracting the touch image generated from the EBS scan from the touch image generated from the BS scan, only the touch signal associated with droplet 908 remains, and it can be determined that the touch signal associated with droplet 908 in FIG. 9B should be excluded as a false touch caused by a grounded shield layer in a gasket or a grounded housing, for example. In other examples, other combinations of the EBS scan and the NBS or BS scans can generally be used to identify and exclude apparent touches that are influenced by grounding paths in the interior or at the edges of a device. For example, touch signals at individual touch nodes in the BS and EBS scans can be added together, and if the sum does not equal approximately double (e.g., within a threshold amount) the touch signal obtained during the BS scan, it can be concluded that the touch node was influenced by a grounding path during the BS scan and should excluded as an intended touch. In other examples, touch signals at individual touch nodes in the BS and EBS scans can be averaged, and if the average does not equal approximately half (e.g., within a threshold amount) the touch signal obtained during the BS scan, it can be concluded that the touch node was influenced by a grounding path during the BS scan and should excluded as an intended touch. Similar combinations or comparisons of touch signals at touch nodes in the NBS and EBS scans can also be utilized to identify and exclude apparent (but false) touches caused by touch nodes influenced by parasitic grounding paths in the device.

Because the difference in the BS and EBS scans occurs primarily in the edge regions, in some examples the comparisons of the BS and EBS scans can be limited to touch signals of touch nodes in predetermined edge regions. In some examples, the edge regions can be empirically determined, for a particular touch panel/housing design, to be those regions where sufficient parasitic capacitive paths to ground exist to cause ungrounded objects to effect some threshold amount of change in the touch signals of touch nodes (e.g., halfway between a baseline no-touch signal level and a recognized touch signal level). In other examples, if no apparent touch is detected in the predetermined edge region in the BS scan, it can be concluded that there are no touch nodes that could have been influenced by a grounding path during the BS scan, and no comparison of the BS and EBS scans needs to be performed in any region of the touch sensor panel (e.g., forgo the EBS scan entirely or forgo the comparison to reduce unnecessary processing).

In some examples of the disclosure, after certain apparent (but likely false) touches are identified for exclusion, all apparent touches in the original NBS or BS image can be assigned identifiers or otherwise tagged, indicating that the apparent touches are either to be further processed or excluded from further processing. In other examples, the touch signals in the original NBS or BS image can be modified to remove the apparent (but likely false) touches prior to further processing.

Figure 10:
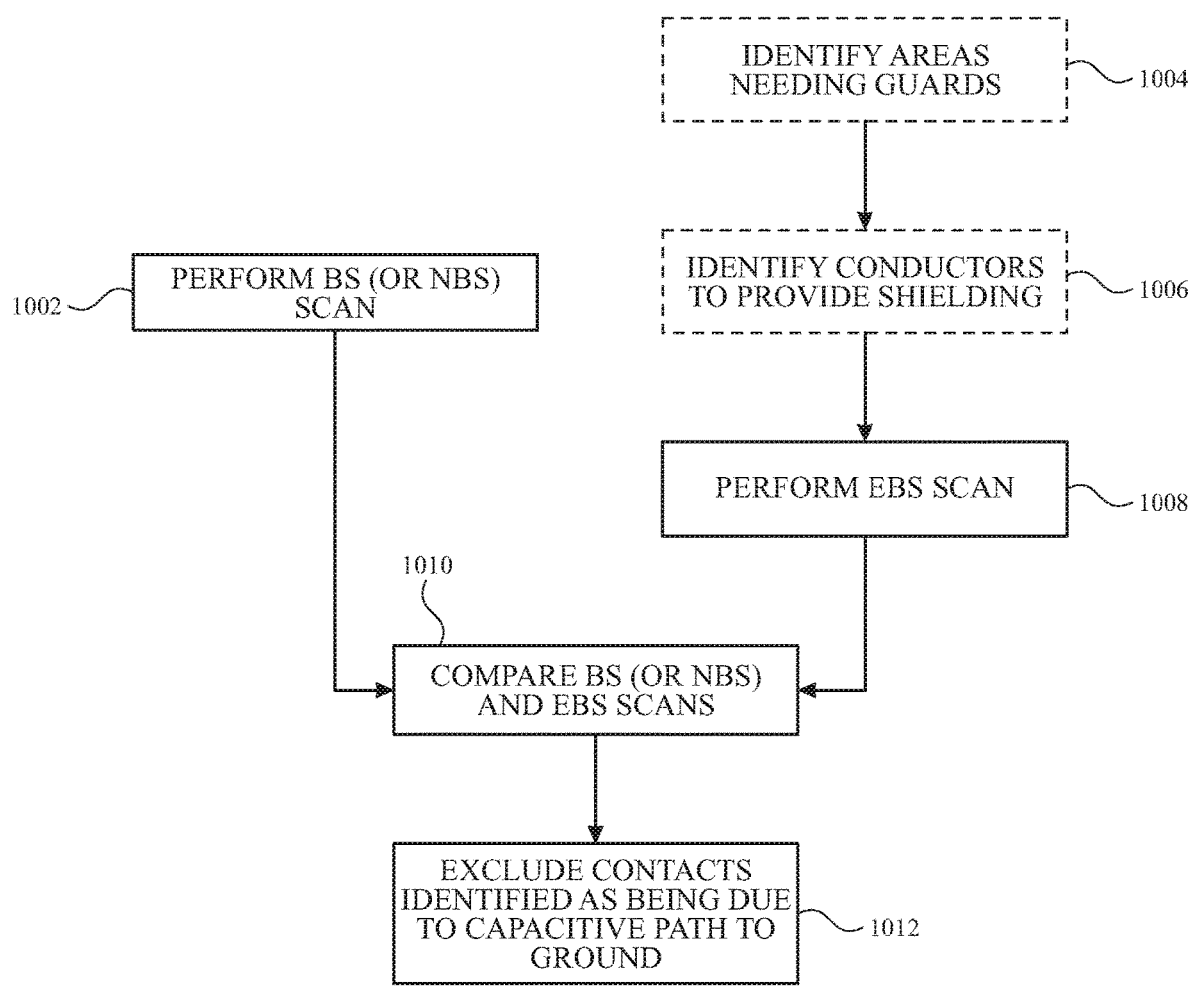
FIG. 10 illustrates a method and process for identifying and excluding apparent (but false) touches caused by parasitic capacitive coupling to ground according to examples of the disclosure.

FIG. 10 illustrates a method and process for identifying and excluding apparent (but false) touches caused by parasitic capacitive coupling to ground according to examples of the disclosure. In the example of FIG. 10, an NBS or BS scan can be performed at 1002 where in the NBS scan sensed touch nodes can be driven with a stimulation signal and non-sensed touch nodes can be held at ground (or a fixed voltage), and in the BS scan sensed touch nodes can be driven with a stimulation signal and non-sensed touch nodes (if any) can be driven with a stimulation signal that has the same characteristics as the stimulation signal being applied to the sensed touch nodes.

At 1004 (in dashed lines to indicate the optional nature of this step), one or more areas capable of providing one or more capacitive paths to ground that may not be adequately shielded by driven touch nodes can be identified. In some examples, these areas can include a grounded conductive layer located between a touch surface and a housing, a housing capable of becoming grounded, or other areas located at the perimeter of, or outside, a touch sensor panel such that a capacitive path to ground can exist with objects on the touch sensor panel even if the touch nodes in the panel are driven with stimulation signals in a BS scan.

At 1006 (in dashed lines to indicate the optional nature of this step), one or more conductors capable of being driven with a stimulation signal to guard against capacitive paths to ground can be identified. In some examples, the conductors can be existing conductors located in proximity to a housing having a particular function that can be driven during touch sensing to provide the desired guard function. Because conductors that are grounded for other functions can exacerbate the problem of providing parasitic capacitive coupling paths to ground, in some examples ideal candidates can be conductors that are normally grounded to perform some function but can be temporarily stimulated instead of being grounded. In other examples, the conductors may be newly added to the product design in proximity to the housing.

At 1008, an EBS scan can be performed where sensed touch nodes can be driven with a stimulation signal, non-sensed touch nodes (if any) can be driven with a stimulation signal that has the same characteristics as the stimulation signal being applied to the sensed touch nodes, and one or more of the conductors (optionally identified at 1006) can also be driven with a stimulation signal that has the same characteristics as the stimulation signal being applied to the sensed touch nodes. In some examples, these conductors can be driven during times when stimulating the conductors does not interfere with other operations that may require or prefer that these conductors be grounded (or held at a fixed voltage).

At 1010, the results of the NBS and EBS scans at 1002 and 1008 can be compared to identify input patches in the NBS scan that were the result of one or more capacitive paths to ground in the device (and not through a touching or proximate object). Additionally or alternatively the results of the BS and EBS scans at 1002 and 1008 can be compared, at 1010, to identify input patches in the BS scan that were the result of one or more capacitive paths to ground in the device (and not through a touching or proximate object) that were not shielded by the driven touch nodes during the BS scan (e.g., a capacitive path to ground through a shield in a gasket, through a grounded housing etc.). In some examples, this comparison can include subtracting the EBS scan from the NBS scan or the BS scan. In other examples, this comparison can include adding or averaging the results of the EBS scan and the NBS scan or the BS scan and using different thresholds to identify these input patches.

At 1012, contacts in the NBS scan that were identified as being the result of one or more capacitive paths to ground in the device (and not through a touching or proximate object) can be excluded from further processing, or contacts in the BS scan that were identified as being the result of one or more capacitive paths to ground in the device (and not through a touching or proximate object) that were not shielded by the driven touch nodes during the BS scan (e.g., a capacitive path to ground through a shield in a gasket, though a grounded housing, etc.) can be excluded from further processing.

The example NBS, BS and EBS scans and comparisons described above can be implemented with self-capacitance touch sensor panels and touch nodes. However, droplets that are capacitively coupled to ground can also present problems for mutual capacitance touch sensor panels, because they can also appear to be touches. Therefore, in some mutual capacitance examples of the disclosure, the conductors identified in block 1006 of FIG. 10 can also be driven with a stimulation signal that has the same characteristics as the stimulation signal being applied to the drive lines in a mutual capacitance touch sensor panel. Driving the conductor areas with a stimulation signal may, in some circumstances (when non-stimulated drive lines are not providing a capacitive grounding path), reduce a droplet's capacitive coupling to ground and cause the droplets to be less visible as apparent touches, even during mutual capacitance touch sensing.

Therefore, according to the above, some examples of the disclosure are directed to a touch sensing device comprising a housing configured to be couplable to ground, a touch surface in proximity to the housing, touch nodes in proximity to the touch surface and configurable to be driven with a first stimulation signal, and one or more conductors distinct from the touch nodes and electrically insulated from the housing. At least a portion of the one or more conductors can be positioned between the touch surface and the housing and configurable to be driven with a second stimulation signal having the same characteristics as the first stimulation signal. Additionally or alternatively to one or more of the examples disclosed above, in some examples the touch nodes are selectively separable into one or more sensed touch nodes and one or more non-sensed touch nodes, the one or more sensed touch nodes are configured to receive the first stimulation signal, and the one or more non-sensed touch nodes and the one or more conductors are configured to receive the second stimulation signal having the same characteristics as the first stimulation signal. Additionally or alternatively to one or more of the examples disclosed above, in some examples the touch nodes form an active touch area on the touch surface, and the one or more conductors are located at least partially outside the active touch area. Additionally or alternatively to one or more of the examples disclosed above, in some examples the one or more conductors are configurable to be biased at a first potential in a first mode of operation, and driven with the second stimulation signal in a touch sensing mode of operation. Additionally or alternatively to one or more of the examples disclosed above, in some examples the touch nodes and the one or more conductors are formed in a same layer. Additionally or alternatively to one or more of the examples disclosed above, in some examples the one or more conductors are an extension of one or more driven shield layers in proximity to the active touch area, the one or more conductors extending the one or more shield layers beyond the active touch area. Additionally or alternatively to one or more of the examples disclosed above, in some examples the one or more conductors are formed in one or more gaskets configured for sealing the touch sensing device. Additionally or alternatively to one or more of the examples disclosed above, in some examples at least one of the gaskets comprises one or more force sensors configured for detecting force applied to the touch surface. Additionally or alternatively to one or more of the examples disclosed above, in some examples the first mode of operation is a shielding operation and the one or more conductors are configurable for being grounded when performing the shielding operation. Additionally or alternatively to one or more of the examples disclosed above, in some examples the touch sensing device further comprises a touch controller communicatively coupled with the touch nodes and the one or more conductors and configured for generating the first stimulation signal and the second stimulation signal. Additionally or alternatively to one or more of the examples disclosed above, in some examples the touch sensing device further comprises a touch controller communicatively coupled with the touch nodes and the one or more conductors and configured for driving the one or more sensed touch nodes with the first stimulation signal, and driving the one or more non-sensed touch nodes and the one or more conductors with the second stimulation signal. Additionally or alternatively to one or more of the examples disclosed above, in some examples the touch sensing device further comprises a touch controller communicatively coupled with the touch nodes and the one or more conductors and configured for biasing the one or more conductors at the first potential in the first mode of operation and driving the one or more conductors with the second stimulation signal in the touch sensing mode of operation.

Some examples of the disclosure are directed to a method of operating a touch sensing device, comprising shielding one or more objects appearing on a touch surface of the touch sensing device from capacitively coupling to ground through a housing of the touch sensing device, wherein the shielding includes driving at least a portion of one or more conductors with a second stimulation signal having the same characteristics as a first stimulation signal driving one or more touch nodes in the touch sensing device, and wherein the one or more conductors are located in proximity to the housing but at least partially outside an active touch area defined by the touch nodes. Additionally or alternatively to one or more of the examples disclosed above, in some examples the method further comprises stimulating one or more sensed touch nodes of the touch nodes with the first stimulation signal, and stimulating one or more non-sensed touch nodes of the touch nodes with the second stimulation signal. Additionally or alternatively to one or more of the examples disclosed above, in some examples the method further comprises identifying at least one of the conductors as being grounded while performing a first function during a first time period and utilizing the conductive material as the one or more conductors driven by the second stimulation signal for a second function during a second time period. Additionally or alternatively to one or more of the examples disclosed above, in some examples the method further comprises biasing the one or more conductors at a first potential in a first mode of operation, and driving the one or more conductors with the second stimulation signal in a touch sensing operation. Additionally or alternatively to one or more of the examples disclosed above, in some examples the method further comprises forming the plurality of touch nodes and the one or more conductors in a same layer. Additionally or alternatively to one or more of the examples disclosed above, in some examples the method further comprises forming the one or more conductors in one or more gaskets configured for sealing the touch sensing device. Additionally or alternatively to one or more of the examples disclosed above, in some examples the method further comprises detecting force applied to touch surface using one or more force sensors in at least one of the gaskets. Additionally or alternatively to one or more of the examples disclosed above, in some examples the first mode of operation is a shielding operation and the one or more conductors are configurable for being grounded when performing the shielding operation. Additionally or alternatively to one or more of the examples disclosed above, in some examples a non-transitory computer readable storage medium stores instructions that when executed by a touch sensing device, cause the touch sensing device to perform the method of one or more of the examples disclosed above.

Some examples of the disclosure are directed to a method of operating a touch sensing device, comprising performing a first scan of touch nodes of the touch sensing device by driving sensed touch nodes with a first stimulation signal, the first scan including first touch signals grouped into first patches indicative of objects capacitively coupled to ground, performing a second scan of the touch nodes by driving the sensed touch nodes with the first stimulation signal while shielding against capacitive coupling paths to ground through the touch sensing device, the second scan including second touch signals grouped into second patches indicative of objects capacitively coupled to ground through the one or more objects, and comparing the first and second scans to determine which of the first patches are indicative of objects capacitively coupled to ground through the touch sensing device. Additionally or alternatively to one or more of the examples disclosed above, in some examples the first scan further includes holding non-sensed touch nodes at a fixed potential. Additionally or alternatively to one or more of the examples disclosed above, in some examples the first scan further includes driving non-sensed touch nodes with a second stimulation signal having the same characteristics as the first stimulation signal. Additionally or alternatively to one or more of the examples disclosed above, in some examples shielding against capacitive coupling paths to ground through the touch sensing device in the second scan comprises driving conductors located at least partially in proximity to a housing of the touch sensing device with the second stimulation signal. Additionally or alternatively to one or more of the examples disclosed above, in some examples the method further comprises excluding the first patches indicative of objects capacitively coupled to ground through the touch sensing device from further touch processing. Additionally or alternatively to one or more of the examples disclosed above, in some examples a non-transitory computer readable storage medium stores instructions that when executed by a touch sensing device, cause the touch sensing device to perform the method of one or more of the examples disclosed above. Additionally or alternatively to one or more of the examples disclosed above, in some examples a touch sensing device can be configured to perform the method of one or more of the examples disclosed above.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensing device, comprising:
a housing configured to be couplable to ground;
a touch surface in proximity to the housing;
touch nodes in proximity to the touch surface and configurable to be driven with a first stimulation signal; and
one or more conductors distinct from the touch nodes and electrically insulated from the housing;
wherein at least a portion of the one or more conductors is positioned at an edge of the touch surface and between the touch surface and the housing and wherein at least a portion of the one or more conductors is configurable to be driven with a second stimulation signal having the same characteristics as the first stimulation signal.

2. The touch sensing device of claim 1, wherein the touch nodes are selectively separable into one or more sensed touch nodes and one or more non-sensed touch nodes;
wherein the one or more sensed touch nodes are configured to receive the first stimulation signal; and
wherein the one or more non-sensed touch nodes and the one or more conductors are configured to receive the second stimulation signal having the same characteristics as the first stimulation signal.

3. The touch sensing device of claim 1, wherein the touch nodes form an active touch area on the touch surface, and the one or more conductors are located at least partially outside the active touch area.

4. The touch sensing device of claim 1, wherein the one or more conductors are configurable to be biased at a first potential in a first mode of operation, and driven with the second stimulation signal in a touch sensing mode of operation.

5. The touch sensing device of claim 1, wherein the touch nodes and the one or more conductors are formed in a same layer.

6. The touch sensing device of claim 3, wherein the one or more conductors are an extension of one or more driven shield layers in proximity to the active touch area, the one or more conductors extending the one or more shield layers beyond the active touch area.

7. The touch sensing device of claim 1, wherein the one or more conductors are formed in one or more gaskets configured for sealing the touch sensing device.

8. The touch sensing device of claim 7, at least one of the gaskets comprising one or more force sensors configured for detecting force applied to the touch surface.

9. The touch sensing device of claim 4, wherein the first mode of operation is a shielding operation and the one or more conductors are configurable for being grounded when performing the shielding operation.

10. The touch sensing device of claim 1, further comprising a touch controller communicatively coupled with the touch nodes and the one or more conductors and configured for generating the first stimulation signal and the second stimulation signal.

11. The touch sensing device of claim 2, further comprising a touch controller communicatively coupled with the touch nodes and the one or more conductors and configured for driving the one or more sensed touch nodes with the first stimulation signal, and driving the one or more non-sensed touch nodes and the one or more conductors with the second stimulation signal.

12. The touch sensing device of claim 4, further comprising a touch controller communicatively coupled with the touch nodes and the one or more conductors and configured for biasing the one or more conductors at the first potential in the first mode of operation and driving the one or more conductors with the second stimulation signal in the touch sensing mode of operation.

13. A method of operating a touch sensing device, comprising:
shielding one or more objects appearing on a touch surface of the touch sensing device from capacitively coupling to ground through a housing of the touch sensing device;
wherein the shielding includes driving at least a portion of one or more conductors with a second stimulation signal having the same characteristics as a first stimulation signal driving one or more touch nodes in the touch sensing device; and
wherein the one or more conductors are located in proximity to the housing wherein at least a portion of the one or more conductors is positioned at an edge of the touch surface between the touch surface and the housing and at least partially outside an active touch area defined by the touch nodes.

14. The method of claim 13, further comprising:
stimulating one or more sensed touch nodes of the touch nodes with the first stimulation signal; and
stimulating one or more non-sensed touch nodes of the touch nodes with the second stimulation signal.

15. The method of claim 13, further comprising identifying at least one of the conductors as being grounded while performing a first function during a first time period and utilizing the conductive material as the one or more conductors driven by the second stimulation signal for a second function during a second time period.

16. The method of claim 13, further comprising biasing the one or more conductors at a first potential in a first mode of operation, and driving the one or more conductors with the second stimulation signal in a touch sensing operation.

17. The method of claim 13, further comprising forming the plurality of touch nodes and the one or more conductors in a same layer.

18. The method of claim 13, further comprising forming the one or more conductors in one or more gaskets configured for sealing the touch sensing device.

19. The method of claim 18, further comprising detecting force applied to touch surface using one or more force sensors in at least one of the gaskets.

20. The method of claim 16, wherein the first mode of operation is a shielding operation and the one or more conductors are configurable for being grounded when performing the shielding operation.

21. A non-transitory computer readable storage medium storing instructions that when executed by a touch sensing device, cause the touch sensing device to perform a method comprising:
shielding one or more objects appearing on a touch surface of the touch sensing device from capacitively coupling to ground through a housing of the touch sensing device;
wherein the shielding includes driving at least a portion of one or more conductors with a second stimulation signal having the same characteristics as a first stimulation signal driving one or more touch nodes in the touch sensing device; and
wherein the one or more conductors are located in proximity to the housing wherein at least a portion of the one or more conductors is positioned at an edge of the touch surface between the touch surface and the housing and at least partially outside an active touch area defined by the touch nodes.

22. A method of operating a touch sensing device, comprising:
    performing a first scan of touch nodes of the touch sensing device by driving sensed touch nodes with a first stimulation signal, the first scan including first touch signals grouped into first patches indicative of objects capacitively coupled to ground;
    performing a second scan of the touch nodes by driving the sensed touch nodes with the first stimulation signal while shielding against capacitive coupling paths to ground through the touch sensing device, the second scan including second touch signals grouped into second patches indicative of objects capacitively coupled to ground through the one or more objects; and
    comparing the first and second scans to determine which of the first patches are indicative of objects capacitively coupled to ground through the touch sensing device.

23. The method of claim 22, the first scan further including holding non-sensed touch nodes at a fixed potential.

24. The method of claim 22, the first scan further including driving non-sensed touch nodes with a second stimulation signal having the same characteristics as the first stimulation signal.

25. The method of claim 24, wherein shielding against capacitive coupling paths to ground through the touch sensing device in the second scan comprises driving conductors located at least partially in proximity to a housing of the touch sensing device with the second stimulation signal.

26. The method of claim 22, further comprising excluding the first patches indicative of objects capacitively coupled to ground through the touch sensing device from further touch processing.

27. A non-transitory computer readable storage medium storing instructions that when executed by a touch sensing device, cause the touch sensing device to perform a method comprising:
    performing a first scan of touch nodes of the touch sensing device by driving sensed touch nodes with a first stimulation signal, the first scan including first touch signals grouped into first patches indicative of objects capacitively coupled to ground;
    performing a second scan of the touch nodes by driving the sensed touch nodes with the first stimulation signal while shielding against capacitive coupling paths to ground through the touch sensing device, the second scan including second touch signals grouped into second patches indicative of objects capacitively coupled to ground through the one or more objects; and
    comparing the first and second scans to determine which of the first patches are indicative of objects capacitively coupled to ground through the touch sensing device.

28. A touch sensing device comprising:
    touch nodes; and
    a processor configured to:
        perform a first scan of the touch nodes of the touch sensing device by driving sensed touch nodes with a first stimulation signal, the first scan including first touch signals grouped into first patches indicative of objects capacitively coupled to ground;
        perform a second scan of the touch nodes by driving the sensed touch nodes with the first stimulation signal while shielding against capacitive coupling paths to ground through the touch sensing device, the second scan including second touch signals grouped into second patches indicative of objects capacitively coupled to ground through the one or more objects; and
        comparing the first and second scans to determine which of the first patches are indicative of objects capacitively coupled to ground through the touch sensing device.

* * * * *